(12) United States Patent
Swats et al.

(10) Patent No.: US 12,437,166 B2
(45) Date of Patent: Oct. 7, 2025

(54) DEPLOYING RFID READERS IN ENVIRONMENTS HAVING A DENSE POPULATION OF RFID TAGS

(71) Applicant: Automaton, Inc., San Diego, CA (US)

(72) Inventors: Melissa Swats, Boca Raton, FL (US); Matthew Lange, San Diego, CA (US); Prokopios Panagiotou, Seal Beach, CA (US); Joe Mueller, San Diego, CA (US); David Stephenson, San Jose, CA (US); Richard Marcks, Jr., San Diego, CA (US)

(73) Assignee: Automaton, Inc., San Diego, CA (US)

( * ) Notice: Subject to any disclaimer, the term of this patent is extended or adjusted under 35 U.S.C. 154(b) by 0 days.

(21) Appl. No.: 18/966,918

(22) Filed: Dec. 3, 2024

(65) Prior Publication Data

US 2025/0094741 A1     Mar. 20, 2025

Related U.S. Application Data

(63) Continuation of application No. PCT/US2023/068002, filed on Jun. 6, 2023.

(60) Provisional application No. 63/349,303, filed on Jun. 6, 2022.

(51) Int. Cl.
    *G06K 7/10*      (2006.01)

(52) U.S. Cl.
    CPC ................ *G06K 7/10128* (2013.01)

(58) Field of Classification Search
    CPC .................................. G06K 7/10128
    USPC ....................................... 235/451
    See application file for complete search history.

(56) References Cited

U.S. PATENT DOCUMENTS

| | | |
|---|---|---|
| 10,013,860 B2 | 7/2018 | Hewett |
| 10,386,474 B2 | 8/2019 | Hewett |
| 10,871,558 B2 | 12/2020 | Hewett |
| 11,043,093 B2 | 6/2021 | Hewett |
| 11,215,691 B2 | 1/2022 | Hewett et al. |
| 11,408,965 B2 | 8/2022 | Hewett et al. |
| 11,543,512 B2 | 1/2023 | Hewett |
| 11,915,567 B2 | 2/2024 | Hewett |
| 11,933,877 B2 | 3/2024 | Hewett |
| 12,013,474 B2 | 6/2024 | Hewett et al. |
| 12,117,548 B2 | 10/2024 | Hewett et al. |

(Continued)

FOREIGN PATENT DOCUMENTS

| | | |
|---|---|---|
| WO | 2023212698 A1 | 11/2023 |
| WO | 2023240088 A2 | 12/2023 |

(Continued)

OTHER PUBLICATIONS

"New AR Room Scanner with LiDAR Camera I magicplan" (Magicplan) Oct. 23, 2020 [online] [retrieved on Sep. 11, 2023]. Retrieved from the Internet entire document, especially 0:44-1:40, 2 pages.

(Continued)

*Primary Examiner* — Allyson N Trail
(74) *Attorney, Agent, or Firm* — Smith Baluch LLP

(57) ABSTRACT

Methods and apparatus for deploying RFID readers in an RFID environment that contains dense populations of tags are described. The RFID readers are deployed using a process that provides adequate link margins so that communication can be established with RFID tags in all regions of interest within the RFID environment.

21 Claims, 19 Drawing Sheets

(56) References Cited

U.S. PATENT DOCUMENTS

| | | |
|---|---|---|
| 12,164,048 B2 | 12/2024 | Hewett et al. |
| 2014/0167918 A1 | 6/2014 | Stern et al. |
| 2014/0222525 A1 | 8/2014 | Heckman, III et al. |
| 2022/0317242 A1* | 10/2022 | Zhu .................. G01S 7/026 |
| 2023/0222299 A1* | 7/2023 | Mazur ............ G06K 7/10148 |
| | | 235/451 |
| 2024/0046211 A1 | 2/2024 | Hewett et al. |
| 2024/0193381 A1 | 6/2024 | Brown, III et al. |
| 2024/0273986 A1 | 8/2024 | Hewett |
| 2024/0295623 A1 | 9/2024 | Hewett et al. |
| 2024/0302522 A1 | 9/2024 | Hewett |
| 2024/0328535 A1* | 10/2024 | Ball .................. G06K 17/0022 |
| 2024/0330614 A1 | 10/2024 | Mueller et al. |
| 2024/0330619 A1 | 10/2024 | Morse et al. |
| 2024/0386375 A1 | 11/2024 | Dhar et al. |
| 2024/0394668 A1* | 11/2024 | Okumura ............ G06Q 10/20 |
| 2025/0045409 A1 | 2/2025 | Winn |
| 2025/0094741 A1* | 3/2025 | Swats ................ G06Q 10/08 |
| 2025/0102665 A1* | 3/2025 | Dhar .................. G01S 13/75 |

FOREIGN PATENT DOCUMENTS

| | | |
|---|---|---|
| WO | 2023240296 A1 | 12/2023 |
| WO | 2023250401 A1 | 12/2023 |
| WO | 2024196835 A1 | 9/2024 |
| WO | 2024196837 A1 | 9/2024 |

OTHER PUBLICATIONS

International Search Report and Written Opinion in International App. No. PCT/US2023/068002 dated Jan. 10, 2024, 19 pages.

Lee, et al. "Installation and evaluation of RFID readers on moving vehicles." Proceedings of the sixth ACM international workshop on VehiculAr InterNETworking. 2009.VANET, Sep. 2009, (online]. (retrieved on Sep. 11, 2023]. Retrieved from the Internet , pp. 1 to 11, 10 pages.

Ma, et al. "WallSense: Device-free indoor localization using wall-mounted UHF RFID tags." Sensors 19.1 (2018): 68., Dec. 25, 2018, (online), (retrieved on Sep. 11, 2023]. Retrieved from the Internet, pp. 1 to 16, especially pp. 8 to 9, fig. 3, 16 pages.

RFID Link Budget Overview. IMPINJ® Whitepaper Rev 1.0 May 7, 2015. 4 pages.

Swedberg, "Pilot Aims to Prove Passive RTLS Success for Manufacturing Site." Sep. 24, 2019, [online], [retrieved on Sep. 11, 2023]. Retrieved from the Internet <URL: https://www.confidex.com/pilot-aims-o-prove-passive-rtls-success-for-manufacturing-site, 4 pages.

XArray and xSpan Gateways: Deployment and Best Practices. IMPINJ Deployment Guide version 2, 2017. 67 pages.

ZEBRA ATR7000 Advanced Array RFID Reader Integration Guide, ZEBRA.com, 117 pages.

* cited by examiner

DEPLOYING RFID READERS IN ENVIRONMENTS HAVING A DENSE POPULATION OF RFID TAGS

CROSS-REFERENCE TO RELATED APPLICATION(S)

This application is a bypass continuation of International Application No. PCT/US2023/068002, filed Jun. 6, 2023, which claims the priority benefit, under 35 U.S.C. 119 (e), of U.S. Application No. 63/349,303, filed Jun. 6, 2022, which is incorporated herein by reference in its entirety for all purposes.

BACKGROUND

Radio-frequency identification (RFID) tags are low-cost devices that can be attached to objects and offer the promise of automated tracking, locating, sales check-out, and inventory of the objects among other commercial and medical applications. There are passive, semi-active, and active types of RFID tags that can be wirelessly interrogated by an RFID reader and emit a wireless, RF reply to the reader. The reply can include information stored in the RFID tag, such as a tag identification number or alpha-numeric sequence and electronic product code (EPC). Other information may be included with the reply.

Passive RFID tags have no battery and are therefore typically lower cost than semi-active and active RFID tags. Passive RFID tags essentially modulate and backscatter energy from an RF interrogation pulse sent by the RFID reader to transmit a reply. Although lower in cost (e.g., on the order of $1/10^{th}$ the cost of an active tag), reply signals from passive RFID tags are weaker at longer ranges. In addition, the read range of a passive RFID tag can be significantly less than the read range of an active tag. For example, the read range of a passive tag may be limited to 100 meters in a line-of-sight environment where there are no intervening objects to scatter the interrogation and reply signals, whereas the read range of an active tag may be over 500 meters in the same environment.

When an RFID reader is deployed in a setting with a dense population of RFID tags (e.g., at least 10 RFID tags per square meter) and that includes objects which will scatter RF signals, the RFID reader may not be able to read all of the tags even if the tags are located within 100 meters of the reader. Such settings occur in warehouse and retail sales facilities, for example. In such cases, it may be necessary to install multiple RFID readers throughout the facility in order to read all of the tags.

SUMMARY

The described implementations relate to selecting locations for RFID readers in environments with dense populations of RFID tags and objects that block, attenuate, and/or scatter RFID signals. The RFID readers are distributed across the environment and located so that all RFID tags in the environment can be read by at least one of the RFID readers. Power calculations can be performed to determine the locations for the RFID readers, so that they are not spaced unnecessarily close to one another.

Some implementations relate to a method of deploying RFID readers in an installation site and the deployed RFID readers. Such a method includes measuring ceiling heights and locations of walls and/or fixtures in the installation site; determining, based on the ceiling heights and the locations of walls and/or fixtures, intended locations for the RFID readers in the installation site; provisioning a central controller for the RFID readers with a configuration file representing the intended locations for the RFID readers; and installing the RFID readers in the installation site. Once the RFID readers have been installed, their actual locations are measured and used to generate an updated configuration file, which is provisioned to the central controller. The central controller and the RFID readers are commissioned to locate RFID tags in the installation site based on (i) signals from the RFID tags received by the RFID readers and (ii) the actual locations of the RFID readers.

The ceiling heights, locations of walls and/or fixtures, and actual locations of the RFID readers can be measured by performing lidar scans of the installation site before and after installation.

Determining the intended locations for the RFID readers can include generating a floor plan of the installation site and a ceiling image representing the ceiling heights and/or identifying potential obstructions based on the ceiling heights and/or coverage volumes of the RFID readers. The intended locations can be selected such that coverage volumes of adjacent RFID readers intersect at a (first) predetermined height (e.g., about 1 meter), which can be based on an expected maximum height of the RFID tags in the installation site and/or a height of a fixture that will hold the RFID tags. The coverage volumes of RFID readers adjacent to the walls intersect the walls at or above a (second) predetermined height (e.g., about 2 meters) based on an expected maximum height of the RFID tags on fixtures along the walls.

Determining the intended locations for the RFID readers can also include generating different sets of possible sensor locations based on a different desired spacings between adjacent sensor locations, determining a coverage and sensor count for each set of possible sensor locations, and selecting one of the sets of possible sensor locations as the intended locations based on the coverages and sensor counts for the different sets of possible sensor locations.

Installing the RFID readers can include adjusting a pitch and/or a roll of at least one of the RFID readers to an angle of 0.0°±0.25°. Installing the RFID readers can also include connecting each of the RFID readers to a corresponding Ethernet switch and connecting the corresponding Ethernet switch to the central controller. After installing the RFID readers, the RFID readers' angular orientations can be measured and used to generate the updated configuration file. If desired, the coverage of the installation site by the RFID readers can be tested before commissioning the central controller and the RFID readers.

Another implementation relates to a method of deploying RFID readers in an installation site and the deployed RFID readers as follows. Corner locations are selected such that coverage volumes of RFID readers at the corner locations intersect walls forming corners at or above a first predetermined height based on an expected maximum height of RFID tags on fixtures along the walls. Perimeter locations are selected such that coverage volumes of RFID readers at the perimeter locations intersect walls at the first predetermined height (e.g., about two meters) and intersect neighboring coverage volumes at or above a second predetermined height (e.g., about one meter) based on an expected maximum height of the RFID tags in the installation site. Interior locations are selected such that coverage volumes of RFID readers at the interior locations intersect adjacent coverage volumes at or above the second predetermined height. The RFID readers are installed at the corner locations, perimeter locations, and interior locations. Then the RFID readers are commissioned to locate RFID tags in the installation site based on (i) signals from the RFID tags received by the RFID readers and (ii) the actual locations of the RFID readers.

If desired, obstructions and/or regions with ceiling heights below a predetermined threshold in the installation site can be identified before selecting the corner, perimeter, and interior locations. After selecting the corner, perimeter, and interior locations and before installing the RFID readers, gaps in coverage provided by the RFID readers at the corner, perimeter, and interior locations can be identified, and locations of the RFID readers can be iteratively added and shifted to reduce and/or eliminate the gaps. After installing the RFID readers and before commissioning them, the actual locations of the RFID readers can be measured. A central controller can be provisioned with a configuration file representing the actual locations of the RFID readers for locating the RFID tags.

Still other implementations relate to a method of locating RFID readers in an RFID environment containing a dense population of RFID tags. The method can include acts of: receiving floor plan information that describes an extent of physical space of the RFID environment; determining first locations within the physical space for a plurality of RFID readers, the first locations being distributed across the physical space in a first pattern; computing a first plurality of peak radio-frequency (RF) power levels at a plurality of locations of interest within the physical space, wherein the first plurality of peak RF power levels are based on RF fields emitted by the plurality of RFID readers and the first locations of the plurality of RFID readers and wherein each location of interest is a sub-region of the physical space that an RFID tag will inhabit within the RFID environment; determining, for at least a first location of interest of the plurality of locations of interest, that a first peak RF power level of the first plurality of peak RF power levels for the first location of interest does not satisfy a link margin criterion, wherein the link margin criterion identifies a target power level that is sufficient to establish communications between at least one RFID reader of the plurality of RFID readers and an RFID tag located at the first location of interest; in response to the first peak RF power level not satisfying the link margin criterion, determining second locations within the physical space for the plurality of RFID readers, the second locations being distributed across the physical space in a second pattern that has spacings between the RFID readers of the plurality of RFID readers that is less than spacings between the RFID readers for the first pattern; computing a second plurality of peak RF power levels at the plurality of locations of interest within the physical space, wherein the second plurality of peak RF power levels are based on RF fields emitted by the plurality of RFID readers and the second locations of the plurality of RFID readers; determining, for at least the first location of interest or a second location of interest of the plurality of locations of interest, that a second peak RF power level of the second plurality of peak RF power levels for the first location of interest or the second location of interest satisfy the link margin criterion, wherein the first location of interest or the second location of interest is a location having a lowest peak RF power level of the second plurality of peak RF power levels; and in response to the second peak RF power level satisfying the link margin criterion, outputting the second locations as intended locations for installing the plurality of RFID readers All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar components).

DETAILED DESCRIPTION

Overview of an RFID Environment

Figure 1:
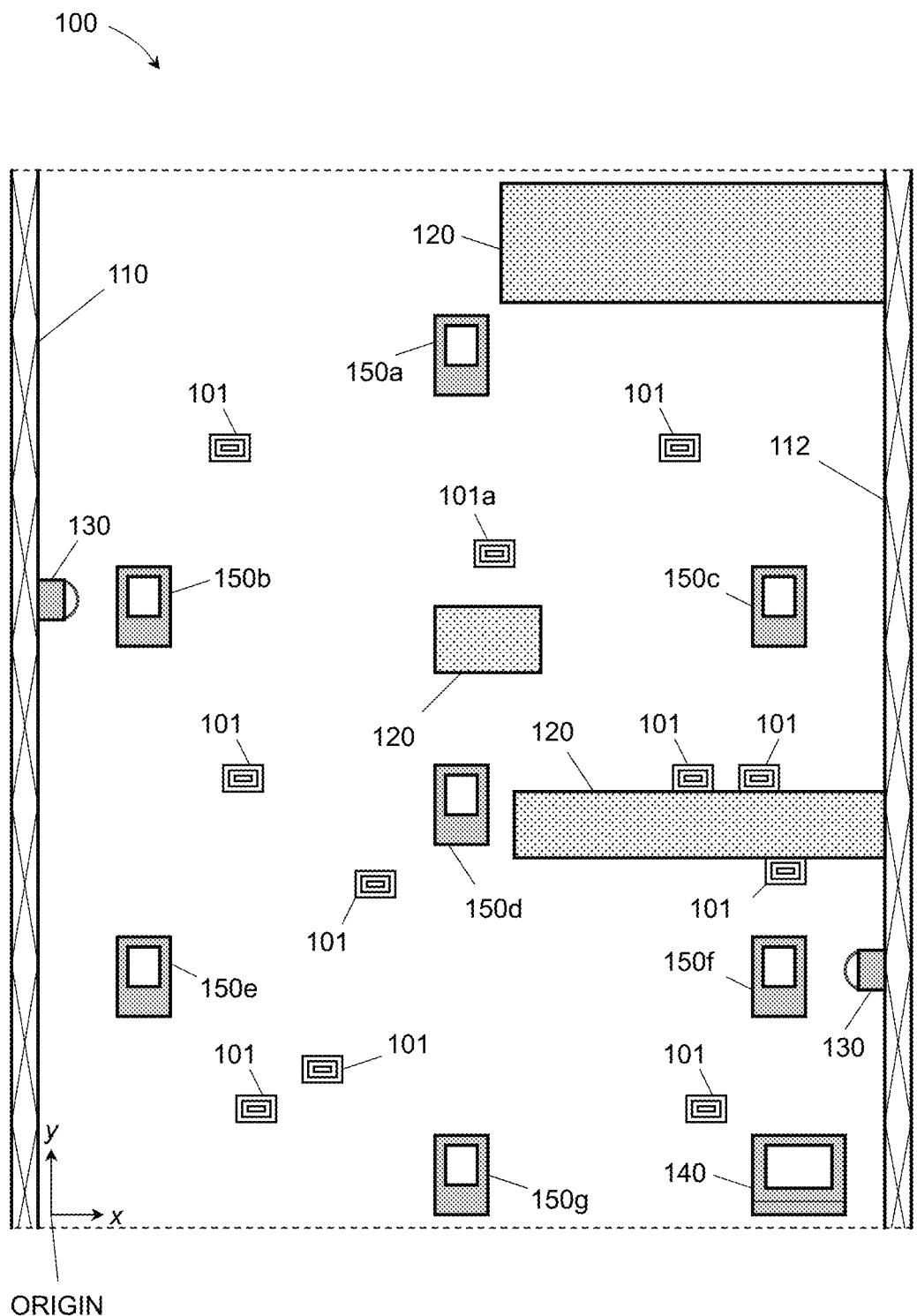
FIG. 1 depicts a multipath RFID environment that includes a plurality of RFID readers and RFID tags.

FIG. 1 depicts a multipath RFID environment 100 in which there can be a dense population of passive RFID tags 101 and a plurality of RFID readers 150, also called RFID tag readers, tag readers, or sensors, to ostensibly communicate with all of the RFID tags 101 in the environment 100. The RFID tags 101 can be attached to objects, which can be identified and tracked by the RFID tags. The RFID environment 100 can be in a retail store or warehouse, for example, though other settings are possible. There can be furnishings 120 in the environment that affect RF signals (e.g., block, attenuate, and/or scatter the RF signals). The furnishings can include shelves, racks, cabinets, etc. that may be used to hold the objects to which at least some of the RFID tags are attached. For example, some furnishings 120 may comprise metal shelving that holds one or more retail items (not shown in FIG. 1) that are tagged with the RFID tags 101. The furnishings can be arranged in rows in some settings, with aisles separating the rows to allow access to all objects tagged with RFID tags. The RFID environment 100 can be bounded by walls 110, 112, ceiling, and floor, any of which can reflect RF signals from the RFID readers 150 and/or RFID tags 101. There may be one or more cameras 130 installed in the RFID environment to capture images of at least portions of the environment. The cameras can be communicatively coupled to a central controller 140, also called a controller or appliance, which can receive and process images from the cameras 130.

The RFID readers 150 are preferably installed in the RFID environment 100 such that together they can query and communicate with every RFID tag 101 in the RFID environment 100. The RFID readers 150 may communicate with each other and/or with the central controller 140 via one or more ethernet switches (not shown), which may also supply electrical power from the central controller 140 to the RFID readers. The central controller 140 may be a computer, laptop, smart phone, or purpose-built device with a processor and non-volatile computer-readable memory adapted to communicate with the RFID readers 150 and issue commands recognizable to the RFID readers 150. The central controller 140 can also receive signals from the RFID readers. For example, the central controller 140 can issue a command to inventory all RFID tags (and attached items) in the RFID environment 100 or to determine the location of one or more RFID tags 101 (and attached item(s)) in the RFID environment. In response to the commands, the central controller 140 can receive signals from the RFID readers 150 that identify RFID tags (and/or attached objects) in the environment 100 and/or can be used to determine the location of the tags and/or attached objects.

The inventors have recognized and appreciated that determining the locations for the RFID readers 150 prior to their installation poses several challenges. In order to communicate with all RFID tags in the environment 100, the RFID readers 150 should be located so that each tag can provide a response that is detectable by at least one of the RFID readers 150. Locating RFID readers 150 too far apart can result in insufficient power at some tag locations and loss of communication with some RFID tags 101 in the environment 100, an undesirable result. Locating RFID readers 150 too close together can incur unnecessary costs for unneeded RFID readers 150 and their installation. Further, physical obstacles (e.g., lights, fire sprinklers, smoke alarms, HVAC vents, etc.) at the installation site can limit the available locations at which RFID readers 150 can be installed. To aid in deployment of RFID readers 150 in an RFID environment 100, the inventors have developed systems and processes to determine intended locations of the RFID readers 150 prior to installation.

FIG. 1 also shows the origin and x and y axes (lower left) of an RFID environment coordinate system for the RFID tags 101 in the environment 100. In addition to communicating with the RFID tags 101, the RFID readers 150 and appliance 140 can also locate the RFID tags 101 based on the tags' responses. For instance, the RFID readers 150 and/or appliance 140 can estimate or determine the angle of arrival, received signal strength, and/or channel for signals from a given RFID tag 101 and use one or more of those metrics to estimate that RFID tag's location with respect to the RFID reader(s) 150 that received the signal(s). If the coordinates of the RFID readers' locations in the coordinate are known, then the appliance 140 or reader(s) 150 can translate these relative tag location estimates into absolute tag location estimates—that is, tag location estimates given in coordinates of the RFID environment coordinate system. For instance, the appliance 140 can supply the coordinates of a tag's estimated location to an app on a smartphone, tablet, or other device that shows the tag's estimated location on a map, overlaid on an image of the installation site, or relative to a wall, doorway, or other reference point. Providing absolute coordinates or coordinates with respect to a known, fixed origin instead of with respect to a given reader makes it easier to corroborate or average tag location estimates derived from measurements by different sensor and to locate the tag and corresponding object.

RFID Readers/Sensors

RFID tag readers 150 can be used in retail stores, warehouses, supply rooms, libraries, museums, galleries, or other environments for tracking objects with RFID tags. Generally, the readers 150 are mounted or hung from the ceiling, e.g., at a height in a range from 8 feet to 20 feet above the floor, so that they emit interrogation signals downward, toward RFID tags on shelves, tables, clothing racks, or other storage units. The RFID readers 150 are arranged so that they provide adequate coverage of the RFID environment 100, e.g., on a grid with a spacing chosen so that all or substantially all of the volume of the RFID environment 100 can be interrogated. The RFID tag readers can be arrayed in a regular (periodic) fashion or distributed irregularly across the RFID environment.

Figure 2A:
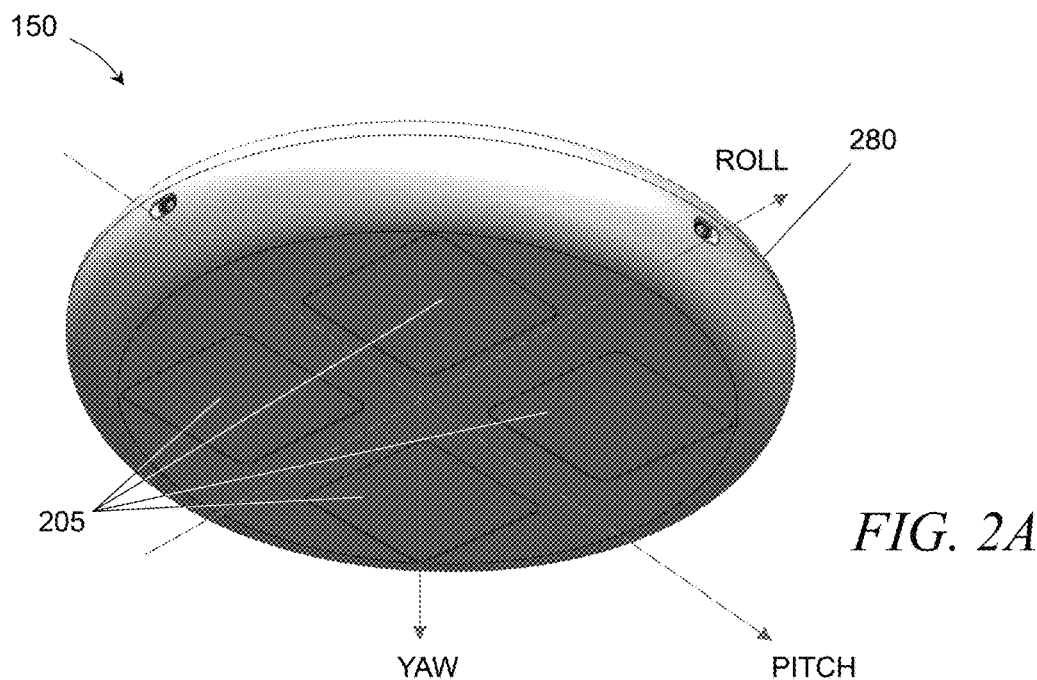
FIG. 2A shows a bottom perspective view of a reader with a four-element, square antenna array that can be used in the RFID environment of FIG. 1.
Figure 2B:
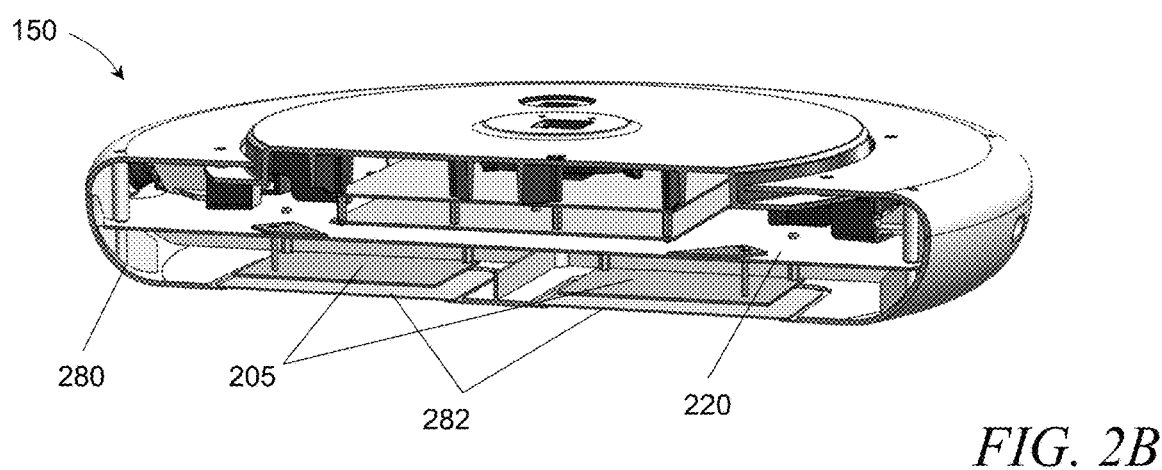
FIG. 2B depicts a perspective cross-sectional view of the reader of FIG. 2A.

FIG. 2A and FIG. 2B depict an example of an RFID reader 150 that includes a phased antenna array having four antenna elements 205. The illustration of FIG. 2A is a perspective view from the bottom of the reader 150. The reader 150 also includes a ground plane 220 inside an enclosure 280 that extends across and behind the antenna elements 205 with respect to the emission direction of an RF beam from the reader. FIG. 2A also shows the reader's pitch, roll, and yaw rotational axes.

The reader 150 can be mounted or suspended from a ceiling or other structure. The enclosure 280 is roughly disc shaped and can be made of acrylonitrile butadiene styrene (ABS), polyvinyl chloride (PVC), vinyl, or another suitable material that is substantially transparent at the frequencies of the interrogation signals and replies. The enclosure 280 may include thinner sections 282 adjacent to the antenna elements 205. These thinner sections 282 can be ⅛" thick or less so that they transmit in-band RF energy to and from the antenna elements 205 without significant attenuation of the transmitted RF energy.

Figure 2C:
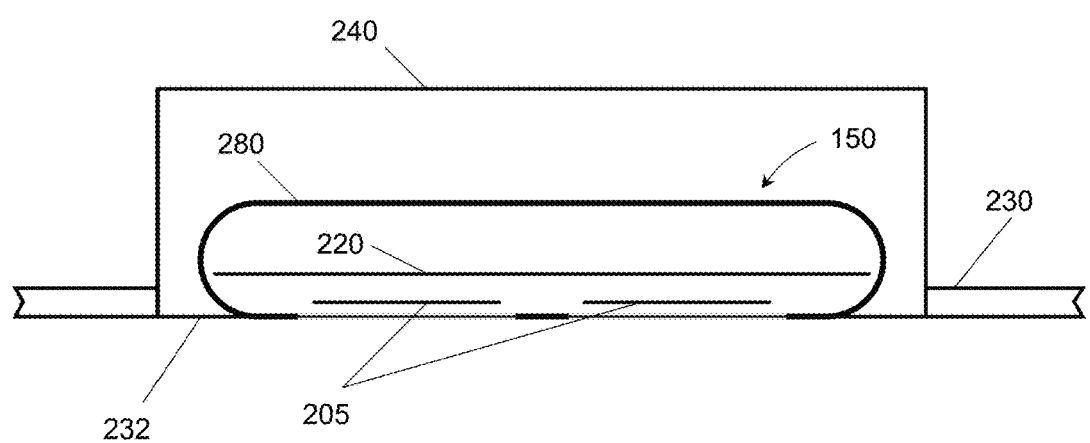
FIG. 2C depicts a mounting arrangement for an RFID reader in a drop ceiling.
Figure 2D:
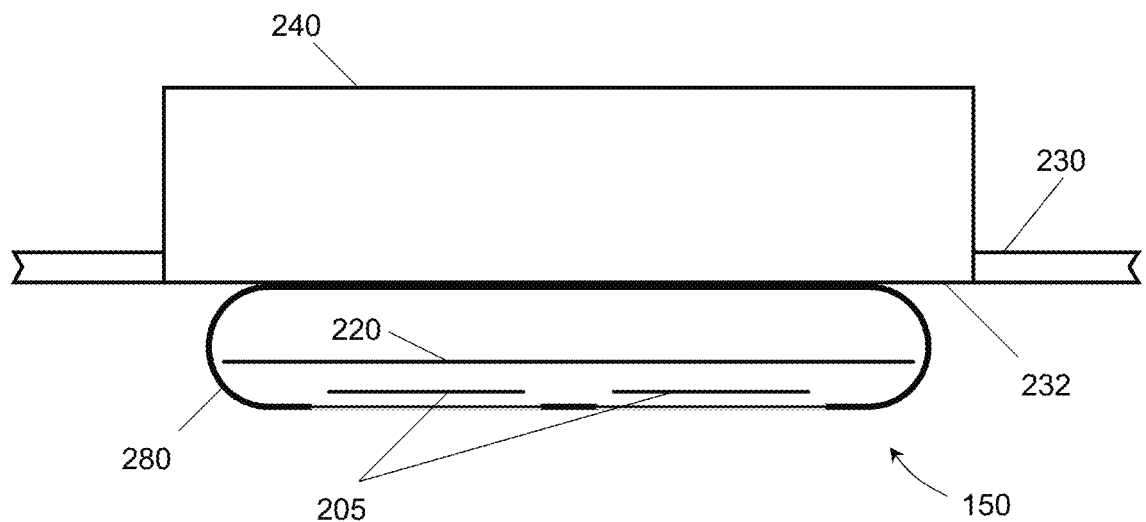
FIG. 2D depicts another mounting arrangement for an RFID reader in a drop ceiling.

FIG. 2C and FIG. 2D illustrate two techniques for mounting the RFID reader 150 with respect to a drop ceiling. A drop ceiling, also called a dropped ceiling, T-bar ceiling, or suspended ceiling, is a secondary ceiling that is suspended from the main ceiling or other overhead structure. Drop ceilings are very common in retail and office environments. A drop ceiling typically has a suspension grid 230 that hangs from the main ceiling or overhead structure and defines square and/or rectangular openings or cells. The suspension grid can be made from metal or plastic and is configured to hold ceiling tiles. In the United States and Canada, these openings are typically 24 inches by 24 inches (610 mm by 610 mm) or 24 inches by 48 inches (610 mm by 1220 mm) and accommodate ceiling tiles and light fixtures. In some cases, fluorescent lights are the same size to fit within a grid. In Europe, the grid opening size is typically 600 mm by 600 mm or 600 mm by 1200 mm. The ceiling tiles and fixtures can be slightly (5 mm) smaller than the grid opening size (e.g., smaller by 5 mm in Europe at 595 mm by 595 mm or 595 mm by 1195 mm).

The antenna elements 205 can be mounted in, above, or below an opening in the suspension grid 230 of the drop ceiling. In FIG. 2C, the reader 150 is housed in a box 240 that fits within an opening and is held in place by the suspension grid 230. The antenna elements 205 may be approximately the same height as the grid 230 and the ground plane 220 may be located above the grid 230. In some cases, an aesthetic panel 232 can be used to cover all or a portion of the RFID reader 150 and the opening in the grid 230. The aesthetic panel 232 can be made from plastic, such as ABS, PVC, Vinyl, or a blend thereof, and be thin so as to insignificantly attenuate RF signals to and from the antenna elements 205.

An alternative mounting arrangement is shown in FIG. 2D, where the RFID reader 150 is mounted so that it extends below the grid 230. Such a mounting arrangement may be used when the suspension grid 230 comprises metal that may interfere with RF signals to and from the antenna elements 205. In either mounting arrangement, the box 240 can contain and/or couple to other components, such as an adjustable mount 210 shown in FIG. 2E, and Ethernet cables to communicate with other readers 150 and a central controller 140, power cables, etc.

Figure 2E:
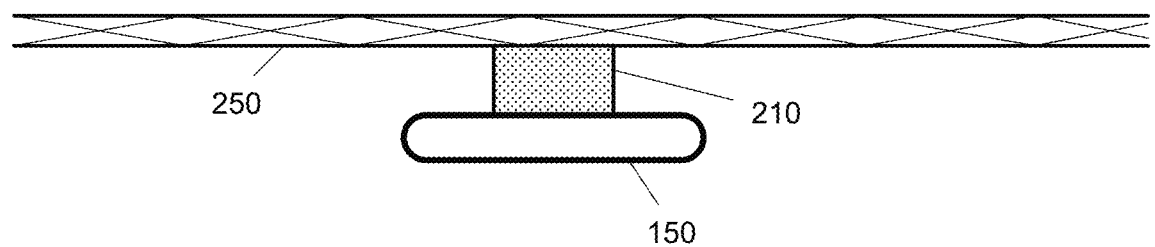
FIG. 2E depicts an RFID reader mounted with an adjustable mount.

One way to aid in alignment of the RFID readers 150 is to mount them with an adjustable mount 210, as depicted in FIG. 2E. The adjustable mount may attach to the ceiling, box 240 as in FIG. 2C or FIG. 2D, or to other overhead structure 250, and the RFID reader 150 can mount to the adjustable mount 210. The adjustable mount can provide three or more degrees of freedom (e.g., three rotational degrees of freedom and one mechanical (vertical) degree of freedom) to adjust the location and/or orientation of the RFID reader 150. In some implementations, the adjustable mount can be used to adjust the RFID reader's pitch, yaw, and roll about the rotational axes shown in FIG. 2A. These degrees of adjustment can allow the RFID reader to be leveled (e.g., with respect to the floor of the RFID environment) and aligned with the x, y, z coordinate system of the RFID environment 100 (e.g., as shown in FIG. 1). The adjustable mount 210 can also be used to raise or lower the reader 150 and possibly to translate it in a plane parallel to the floor or ceiling.

Deploying and Installing RFID Readers at an Installation Site

Figure 3A:
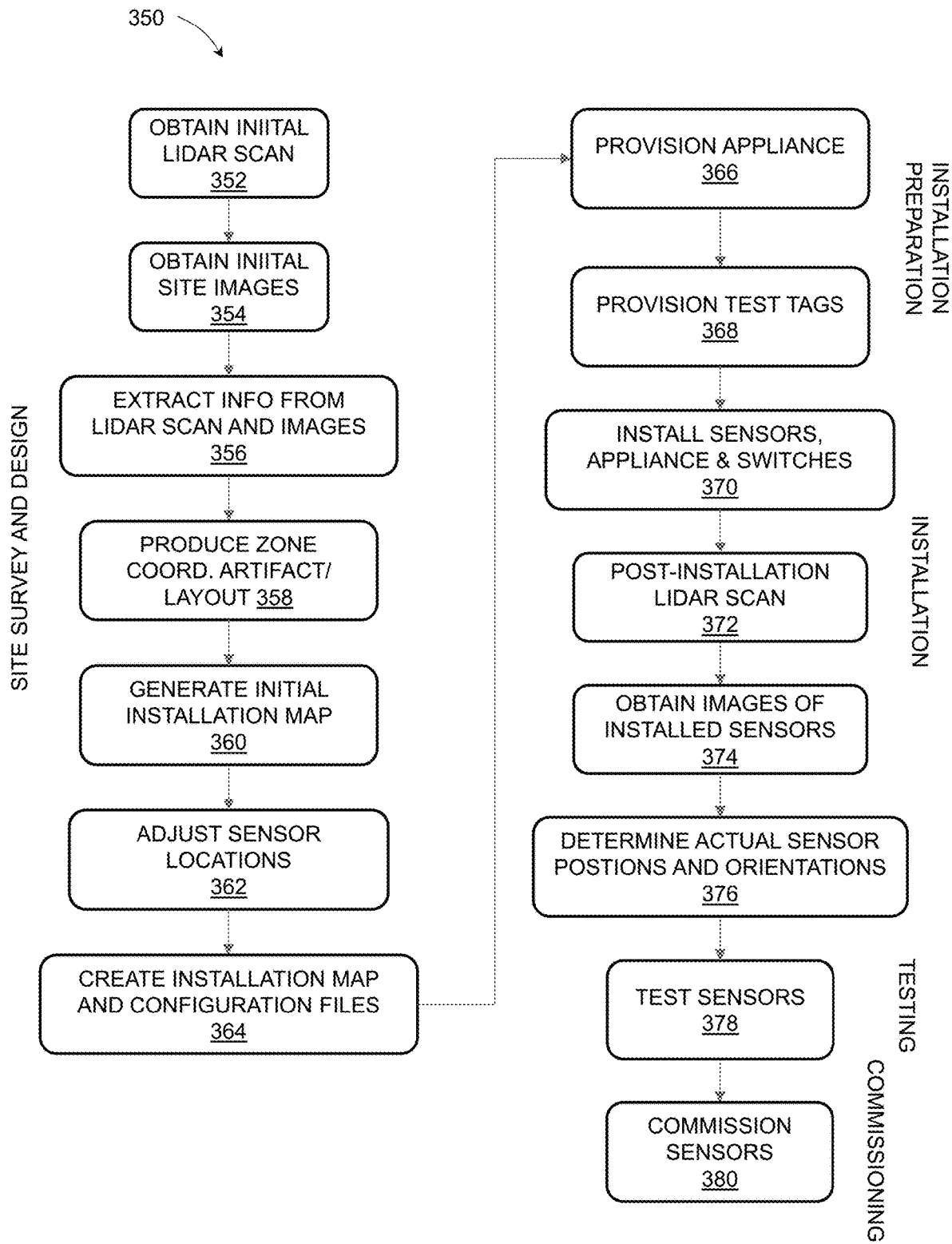
FIG. 3A depicts a process for deploying RFID readers in an RFID environment.

FIG. 3A illustrates a process 350 for deploying RFID readers 150 at an installation site, such as a retail store, warehouse, office, library, healthcare facility, or other site that stores or houses RFID tags. The process 350 generally takes place in five stages or phases: (1) site survey and design; (2) installation preparation; (3) installation; (4) testing; and (5) commissioning. These phases are typically carried out sequentially, with some activities occurring at the installation site and other activities occurring either at the installation site or elsewhere.

Deployment begins with acquiring initial lidar scan(s) (act 352) and image(s) (act 354) of the installation site with a portable lidar scanner and camera, respectively, as part of the site survey and design stage. These representations should show the ceiling, walls, floor, and fixtures in enough detail and with fine enough spatial resolution (e.g., 6 inches, 3 inches, 1 inch, or finer) to identify and locate vents, sprinkler heads, and other potential obstructions on the ceiling, walls, and floor. The lidar scans and images can be uploaded to a server or to a distributed collection of servers that host software and infrastructure and is accessed over the Internet or another suitable computer network so that they can be accessed off-site. (Such a distributed collection of servers is commonly called the cloud.) If desired, the lidar scans and/or images can be annotated, e.g., with information about physical obstructions and/or installation issues.

Figure 3B:
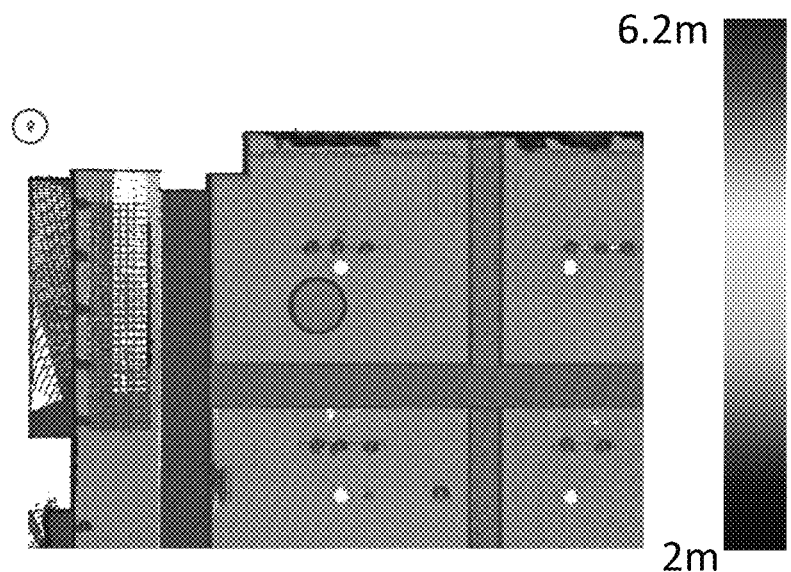
FIGS. 3B and 3C shows shaded ceiling images generated during the process of FIG. 3A.
Figure 3C:
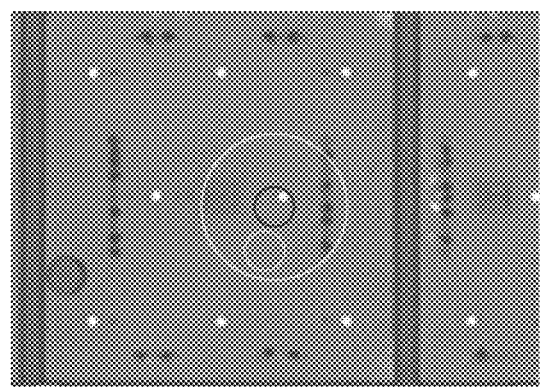

Next, information about the installation site is extracted from the lidar scans and images (act 356) for use in generating a map or plan of the locations at which the sensors are to be installed, optionally after the lidar scans have been aligned properly or otherwise validated. In particular, a person using an appropriately programmed computer can extract a floorplan or other representation of the walls, doorways, and/or other aspects of the installation site from the lidar scans, e.g., in the form of a computer-aided design (CAD) line drawing (e.g., a .dxf file). This user can also create a ceiling image or map like the ones in FIGS. 3B and 3C based on the lidar scans that indicates the ceiling height (distance from the floor). The ceiling image can be shaded or colored to show the ceiling height at regular intervals along the ceiling, for example, along a square, triangular, or hexagonal grid with spacing between adjacent grid points of about 0.25 meters. The ceiling image is used for adjusting the planned positions of the sensors as explained below. The user also creates a fixture image from the installation site images for use in designating different zones and determining the coordinates of those zones. If desired, the user can upload the floorplan, ceiling image, and fixture image to the cloud.

Uploading the floorplan, ceiling image, and fixture image to the server triggers the production of a zone coordinates artifact or zone layout that contains boxes and labels for each zone (act 358), including both customer and RFID/stateful inventory (SI) zones. Typical stateful inventory zones include cashier, transition, and stockroom zones; customer zones can include or have other uses, e.g., men's dressing room, clearance items, etc. For more on SI, see, e.g., International Application No. PCT/US2023/061645, entitled "Stateful Inventory for Monitoring RFID Tags," which is incorporated herein by reference in its entirety for all purposes). The boxes and labels can be used for visualizing the zones (e.g., on a map or image) and for associating estimated tag locations and other positions with different zones. The zone coordinates artifact is saved for use in adjusting the sensor positions and provisioning the appliance and sensors as described below.

When the floorplan is posted to the cloud, it can trigger automatic generation of an initial installation map of possible sensor position (act 360) by the server or another processor executing instructions stored on a non-volatile computer memory. This installation map gives absolute dimensions for positions of the sensors, including for stateful inventory sensors, which cover stateful inventory zones (e.g., entrance) of the installation site. The sensor locations can be overlaid on the initial lidar scans and used to create both configuration files (e.g., JSON files) for the appliance and a model (e.g., in .glTF file format) of the installation site that represents the installed sensors, walls, rooms, zones, and zone labels for the installation site.

The installation map can be generated from the floorplan, ceiling image, zone coordinates artifact, and models of the RFID readers' antenna patterns, ranges/reaches, or coverage volumes. For instance, the antenna patterns can be modeled as cones with 60-degree vertex angles or as square pyramids with curved profiles (e.g., as in FIGS. 5A-5F, described below). This initial installation map can be computed according to a generic approach in which the sensors are laid out on a regular grid overlaid on a representation of the ceiling. The grid can have an inter-sensor spacing along the ceiling that depends on the sensor height(s), the sensors' coverage volumes, ranges, antenna patterns, and a desired overlap of coverage volumes or antenna patterns from adjacent sensors at a certain height (e.g., about 1 meter above the floor). If desired, the inter-sensor spacing can be scaled (e.g., made shorter or longer) by applying an appropriate tag sensitivity scaling factor to the coverage volume or sensor reach, which is the farthest horizontal distance at which a sensor can activate a tag (e.g., the distance measured along the floor or ceiling from the sensor's location to the tag's location).

Next, a user can adjust the sensor positions in the initial installation map to resolve potential coverage issues and/or interference with other objects (act 362). For instance, the user can identify and eliminate invalid sensor positions, such as positions that are too low (e.g., <3 meters high) or too close to fixtures, sprinklers, plumbing, HVAC ducts, vents, or other obstacles. The user can also adjust sensor positions for aesthetic reasons and/or to provide the desired coverage in high or low traffic areas or zones. For instance, the user can add or remove sensors or change the sensor spacing/ increase the sensor density in zones where tags are expected to be more or less densely packed, moving, and/or interrogated more or less frequently by the sensors. The user may make these changes to provide the desired overlap between coverage volumes/antenna patterns of adjacent sensors, to ensure the number of sensors per square foot of ceiling is above or below a predetermined threshold value, and/or to account for unfavorable tag orientations or positions.

Once the user has finished adjusting the sensor locations, the adjusted sensor positions are persisted in a finalized installation map (act 364). The user can add reference points with dimensions near each sensor to help the installer locate each sensor position more easily during installation. Suitable reference points include but are not limited to easily identifiable objects or features, such as vents, sprinkler heads, lights, exit signs, doorways, etc. Alternatively, or in addition, the reference points can be generated or selected automatically. For instance, the automatically selected can include the wall(s) nearest to a desired sensor location. Walls selected for use as reference points may have normal vectors that are offset by at least 60 degrees to provide sufficient dimensioning in the x and y directions of the installation site. An installer can use the finalized installation map, together with information about the electrical circuit (e.g., ampacity) at the installation site, to generate a bill of materials for installation hardware as part of installation preparation.

Continuing with installation preparation, the installer collects information about each sensor destined for installation at the installation site, including model number, serial number, and media access control (MAC) address, for example, by scanning bar codes or Quick Response (QR) codes on the sensors or their packaging. This metadata is uploaded to a server, which uses it to look up internet protocol (IP) addresses for the Power-over-Ethernet (POE) switches that are used to connect the appliance/controller to the installed sensors at the installation site. The switches can be configured manually or automatically.

A technician or installer uses a Progressive Web App (PWA) to retrieve the controller's certificate and provisions this certificate to the server that stores the sensor installation information (act 366). When the controller is connected to the LAN at the installation site, the controller connects to the server automatically and gets fully provisioned. During this stage of provisioning, the controller downloads a new image from the cloud and reboots into that image. The controller also downloads configuration data from the server, including sensor serial numbers, MAC addresses, configuration files (e.g., JSON config files), and the final installation map with sensors assigned to locations by serial number and/or MAC address. The controller also invokes an RFID MAC schedule generator that produces three schedules for the sensors to follow when transmitting and receiving signals: (1) a sensor test operation schedule, (2) a coverage test operation schedule, and (3) a normal daytime/nighttime operation schedule. The first two schedules are used for testing (act 378, described below), and the third schedule is used after commissioning (act 380).

Installation preparation can also include provisioning one or more RFID test tags (act 368) for testing and commissioning the installed appliance and sensors. These RFID test tags, also called cards, facilitate the parallel deployment of sensors in several installation sites at a time. Each set or kit of RFID tags can have a unique kit number and may include several RFID test tags (e.g., 10, 25, 50, 75, 100, or more or fewer tags, or one RFID test tag per sensor).

Each RFID test tag is a passive RFID test tag that stores the corresponding set or kit number and a unique EPC. The kit number is useful for sorting RFID test tags from different kits, and the EPCs help the installer or tester place a specific RFID test tag at a specific location in the installation site. A kit can be provisioned by uploading a file containing the EPCs and numbers of the corresponding cards to the server.

At this point, the sensors, appliance, and switch(es) can be installed at the installation site (act 370). The appliance, switch(es), and an optional patch panel can be installed in a rack in a closet or other back-of-house space. Once the appliance is connected to the LAN, it completes provisioning by downloading images from the server as described above. The installer lays out the sensors in the store according to the finalized installation map, matching the serial numbers of the sensors to the annotated positions on the finalized installation map. The installer installs the sensors in those positions, taking care to ensure that each sensor is set to the desired height, pitch, and roll (where pitch and roll are rotations about axes that are perpendicular to each other and parallel to the ceiling/floor). The mounting bracket may allow the installer to adjust the sensor's height, pitch, and/or roll so that it falls within the desired tolerance(s), e.g., to pitch and roll angles of 0.0°+0.25°. Deviations from the desired pitch and roll angles can degrade sensor performance, especially for sensors that are installed higher above the floor.

The installer can connect the sensors to the switch(es) with Ethernet cables or other connectors that provide both electrical power and network connections (e.g., PoE connections). Alternatively, the sensors can be connected wirelessly (e.g., over WiFi connections) to the appliance and powered by separate power supplies or connections.

Once the sensors have been installed, the installer performs a post-installation lidar scan of the installation site (act 372) and takes pictures of the installed sensors (act 374). The post-installation lidar scan provides the actual (absolute) locations of the installed sensors. Ideally, the actual locations should match the desired locations specified by the finalized installation map. In practice, however, the actual locations may deviate from the desired locations, e.g., due to obstacles unforeseen during site survey and design, installation difficulties, inaccuracies in the installation map or site survey data (e.g., images or lidar scans), or errors in installation. Because each sensor locates RFID tags with respect to itself, knowing each sensor's actual location makes it possible to translate that sensor's relative RFID tag location measurements accurately and precisely onto an absolute coordinate system, e.g., with an origin at one corner of the installation site.

The images of the installed sensors provide proof of proper installation and show the orientations of the sensors with respect to each other. In particular, the images show the sensor yaw, or rotation about an axis perpendicular to the floor/ceiling, e.g., as indicated by clocking marks or other fiducial marks (e.g., logos) on the outer housing of each sensor. The yaw or clocking marks indicate the yaw or rotational orientation of the sensor's antenna array for use translating relative angles of arrival determined by that sensor into an absolute coordinate system.

The post-installation lidar scan and images can be uploaded to the server and used to determine each sensor's location and yaw angle in the installation site's absolute coordinate system (act 376). This information can be used to update the sensor and/or appliance configuration files, which are updated and exported to the sensors and/or appliance by the server.

As noted above, each sensor can be assigned to and installed in a particular position, e.g., by sensor serial number. Although this may be readily done when mounting a few RFID readers in a small space, it can become time consuming to match each reader's serial number to a particular installation location when installing many sensors in a larger space. Alternatively, discovery of the RFID readers' locations can be done after installation of the RFID readers. For example, the controller 140 can instruct one of the RFID readers 150*b* (which may have a unique network address) to emit a signal for the other RFID readers to detect. The relative location of the emitting reader 150*b* can be determined based on received signal strengths, signatures, and/or angle(s) of arrival of the signal as detected by the other RFID readers, for example. Once the relative locations and identities of the RFID readers 150 are determined for all readers in the RFID environment 100, the installation locations (which may be output by the process 200) can be mapped to each RFID reader 150 in the RFID environment 100.

The installed sensors can be tested to ensure that they are functioning properly (act 378) before they are used to locate and interrogate RFID tags at unknown positions at the installation site. For instance, the installer can place the cards from the RFID test tag kit throughout the store (e.g., with card #1 directly under sensor #1, card #2 directly under sensor #2, and so on). With the cards in position, the sensors reads the cards according to the sensor test operation schedule and forward their measurements to the appliance, which processes the data as appropriate and forwards the results to the server. The server uses the data to determine whether or not the sensors passed the test. If the results indicate that each and every card is positioned underneath the corresponding sensor, then the sensors and appliance pass the test.

The sensors can also be tested to ensure that they provide the desired/intended coverage of the installation site. To test for coverage, the installer lays out the around the installation site, e.g., on top of fixtures or tables and in places where RF coverage might be questionable. The sensors try to read all of the cards according to the coverage test operation schedule without necessarily estimating the cards' positions. If other RFID tags are present, then the sensors may filter or query responses from the cards. The sensors pass the coverage test if they can read a preselected number or percentage of the cards (e.g., 90%, 95%, or 99%). The installer can also test electrical power connections, endurance, network connectivity, the ability to connect mobile devices to the controller via an app, etc.

As a final test, the sensors may start tracking and locating unknown RFID tags that enter, leave, and/or move around the installation site, e.g., according to the normal daytime/nighttime operation schedule. The sensors' measurements can be compared to RFID tag measurements gathered with a handheld RFID scanner over several hours, days, or weeks. If the sensors' measurements match the measurements gathered with the handheld RFID scanner (e.g., to within a certain percentage or threshold), then the sensors are commissioned (act 380) and enter service.

Determining Installation Locations for RFID Readers

There are several challenges associated with selecting the locations for the RFID readers 150 in the RFID environment 100. Ideally, the RFID readers 150 should be laid out so that each possible location for an RFID tag 101 in the RFID environment 100 can be read and located by one or more RFID readers 150. This desire for complete, reliable coverage implies a denser layout of RFID readers 150. At the same time, the RFID readers 150 should be placed sparingly, in easy-to-reach locations, to reduce or minimize overall system cost and installation cost. In addition, there should be no need to move the RFID readers 150 after they have been installed, e.g., to account for movement or reorientation of fixtures 120 or other obstacles within the RFID environment 100. Moving one RFID reader 150 can interrupt system operation, incur additional expense, and lead to a need to move other RFID readers 150.

With these challenges in mind, there are several strategies for selecting locations for RFID readers 150 and installing RFID readers 150 at those locations. In a generic approach, for example, the RFID readers 150 are laid out in a grid (e.g., a square or hexagonal grid) at spacing determined based their mounting height(s), their range(s)/coverage volume(s), and the desired overlap at a given height between adjacent RFID readers 150. The grid spacing/sensor density can be adjusted based on the expected tag density and/or the expected use for the portion of the RFID environment 100. For instance, sensors may be located closer together above points-of-sale, entrances, and/or exits and farther apart in stockrooms or loading areas. The generic approach generally provides good overall coverage throughout a space, can be easily automated, and usually involves less manual inspection. It generally is not affected by fixture movement or re-organization but can leave areas lacking coverage if the sensor density is too low or be expensive to install if the sensor density is too high.

In a targeted approach, the locations of the RFID readers 150 are customized based on the physical layout of the RFID environment 100 and/or the desired coverage for certain areas or zones of the RFID environment 100, e.g., based on expected use and/or tag density. A targeted sensor layout may include more sensors/sensors that are closer together in zones with higher tag densities as well as sensors at specific positions, e.g., directly over a point-of-sale, entrance, or exit. Targeted layouts often provide better sensor coverage in difficult areas (e.g., zones with highly tag traffic or irregular shapes) and tend not to have too many or too few sensors for the desired coverage. On the other hand, targeted layouts tend to take more time to produce (it is more difficult to produce them automatically) and involve more verification of sensor placement. They also tend to be more susceptible to changes in RFID system performance due to changes in fixture locations and/or tag spatial distributions within the RFID environment 100.

Targeted approaches to determining or selecting RFID reader locations tend to work well in RFID environments with fixed or static fixtures (i.e., fixtures that don't move or move very infrequently). With information about the sizes, locations, and orientations of static fixtures, an automated sensor placement process can account for the static fixtures when determining possible sensor locations. Size, location, and orientation information about static fixtures can be determined from sufficiently detailed architectural plans or floorplans or from measurements of the RFID environment. If the fixtures are mounted on or fixed to the walls, floor, or ceiling, then their positions can be estimated or derived from the architectural plans or floor plans.

A hybrid approach to determining suitable RFID reader locations in an RFID environment incorporates elements of the generic and targeted approaches. The targeted approach may be employed in certain zones, such as exits, cashiers, receiving, outbound, and/or stockroom areas as well as other zones with strict guidelines for sensor placement. Even with the targeted approach, sensor locations can be determined automatically for zones with strict guidelines for sensor placement. The generic approach (e.g., selecting a predefined grid, 2-dimensional array, or other geometric pattern of sensor locations) can be applied to sales floor/front-of-house zones or to warehouses or other RFID environments.

Antenna Patterns and Coverage Volumes for RFID Readers

The coverage volumes the RFID readers affect how close the RFID readers should be to each other in order to read all of the RFID tags in an RFID environment. The coverage volume, also called the coverage pattern, is the volume within which an RFID reader can reliably activate passive RFID tags. In other words, an RFID sensor can reliably activate a passive RFID tag within its coverage volume but may not be able to reliably activate a passive RFID tag outside its coverage volume. In reality, there may be RFID tags that are impossible to activate even within the coverage volume, e.g., due to attenuation or scattering by other objects (multipath) within the coverage volume or coupling between RFID tags. For this reason, it can be more convenient to define a sensor's coverage volume as the locus of points or locations to which the RFID sensor can deliver or project a certain amount of RF power (e.g., the activation threshold power for a passive RFID tag plus some margin to account for multipath or inconvenient tag orientations).

An RFID sensor's range depends on its transmission power, the amount of power required to turn on a passive RFID tag, and attenuation, among other things. Generally, the maximum transmission power is regulated, and the minimum amount of power required to turn on a passive RFID tag depends on the RFID tag, its orientation, and its proximity to other RFID tags or metallic objects. Attenuation can vary and depends on distance, scattering, etc. If desired, the range can be scaled by a sensitivity factor or cushioned with a link margin, described below with respect to FIG. 9.

The range also depends on the RFID reader's antenna. Most RFID readers have directional antennas, i.e., antennas that emit and receive RF waves preferentially in some directions. This directional preference can be characterized by a radiation pattern, also called an antenna pattern or far-field pattern, which is a representation of the angular dependence of the strength of the RF waves emitted by the antenna. Reciprocity ensures that an antenna's sensitivity to incoming signals as a function of direction, also called its receiving pattern, is identical to its radiation pattern. This directional dependence means that an RFID reader with a directional antenna has a range that can vary with direction/angle. The shape of a sensor's coverage volume depends on the range and radiation pattern of the RFID reader's antenna (array). Generally, the coverage volume should be or resemble the antenna pattern truncated at a distance from the sensor/antenna equal to the range.

The antenna pattern for a reader 150 can be determined empirically or from specifications provided with the RFID reader 150. In some cases, the emission pattern can be determined primarily based on the reader's antenna configuration and how it is operated (e.g., whether the antenna comprises an array of antennas and whether they are used to produce a static emission pattern or a beam that is swept). In some implementations, the RFID reader 150 can have a phased-array antenna that allows for beam forming and steering.

Figure 4A:
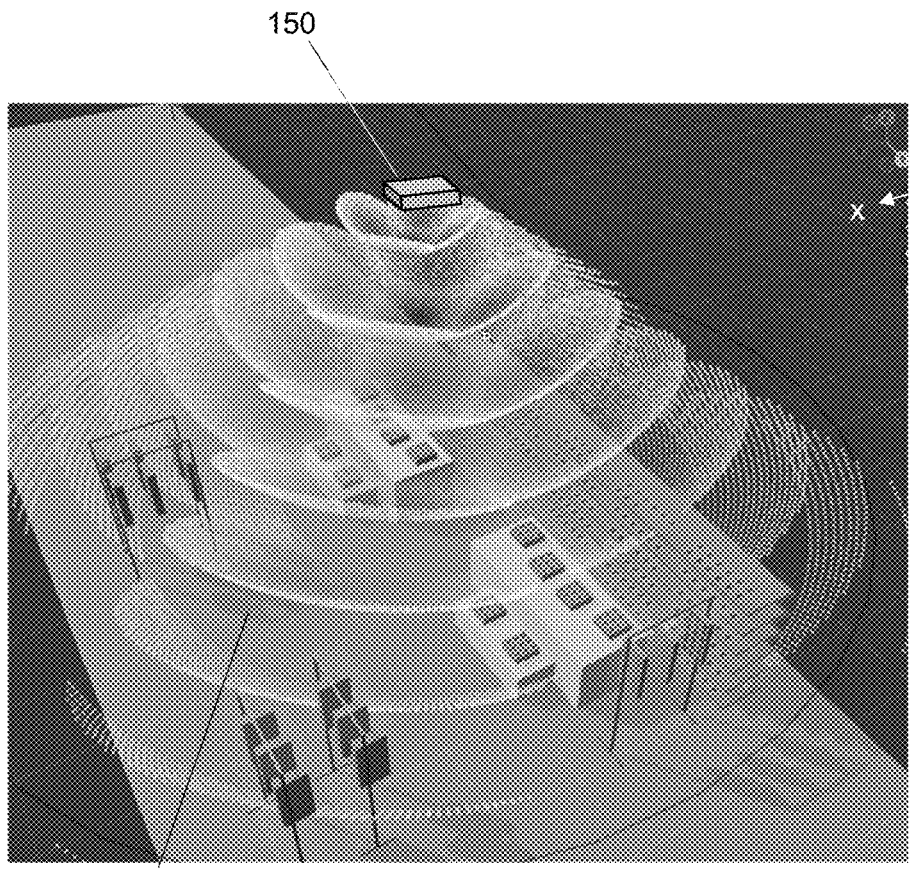
FIG. 4A depicts RF fields that can be emitted by an RFID reader to interrogate and communicate with RFID tags in an RFID environment.

FIG. 4A shows an RF beam 410 that is emitted by a ceiling-mounted RFID reader 150 and steered to several directions. In this example, the beam is steered in a sequence of emissions to five different directions. The five different directions are straight down in the −z direction (an inclination angle of −90 and an azimuthal angle of 0 degrees) and four directions having an angle of inclination that is −45 degrees and azimuthal angles of 45 degrees, 135 degrees, 225 degrees, and 315 degrees. The inclination angle is measured with respect to the x-y plane, and the azimuthal angle is measured from the x axis in the x-y plane. Other emission directions, and emissions in greater or lesser number, can be used for other implementations of the process 200.

Figure 4B:
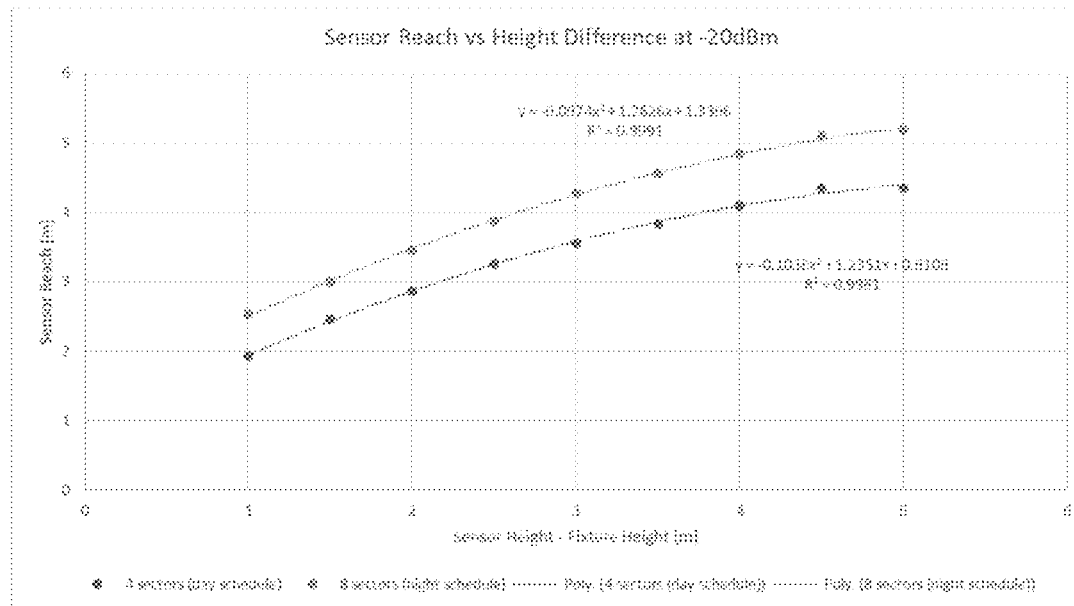
FIG. 4B is a plot of simulated sensor reach versus sensor height for four sectors (lower trace) and eight sectors (upper trace).
Figure 4C:
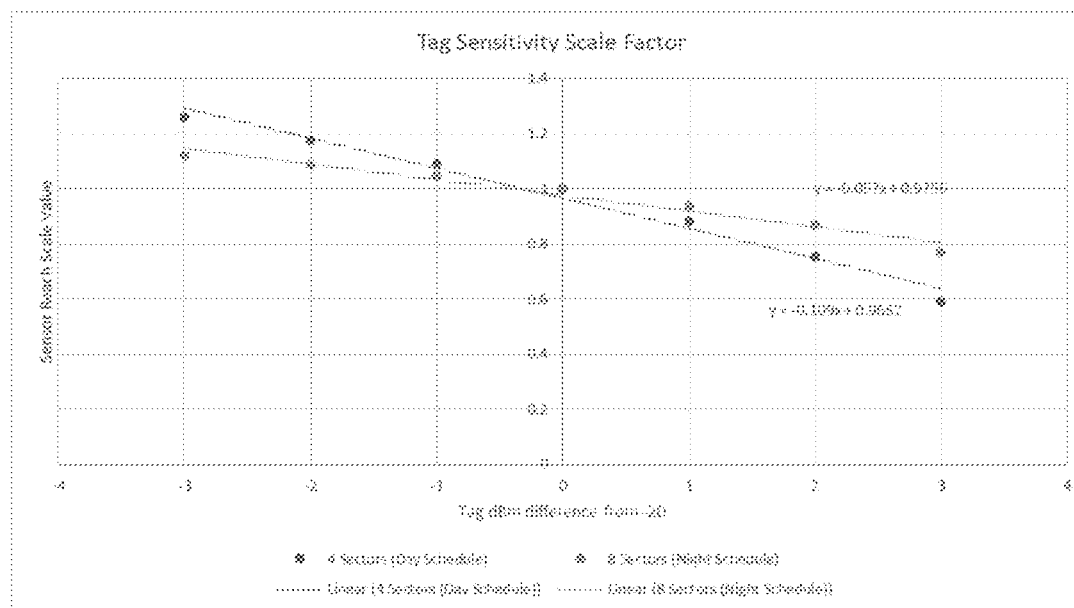
FIG. 4C is a plot of simulated sensor reach scale value versus difference in detected amplitude of tag response for RFID sensors with four sectors enabled (steeper trace) and eight sectors enabled (shallow trace).

FIGS. 4B and 4C are simulations of sensor performance as a function of height and number of enabled beam-steering sectors. FIG. 4B is a plot of the sensor reach versus the height at which the sensor is mounted for four and eight enabled beam-steering sectors (lower and upper traces, respectively). The additional beam-steering sectors are at higher elevations. FIG. 4B shows that range is affected by sensor height and the number and elevations of the beam-steering sectors. FIG. 4C is a plot of the sensor reach scale value versus difference in detected amplitude of tag response for a sensor with four or eight enabled beam-steering sectors (steeper and shallower traces, respectively). Again, the additional beam-steering sectors are at higher elevations.

Automated Sensor Placement

FIGS. 5A-5F illustrate an automated sensor placement process that can be used to generate the installation map (acts 360, 362, and 364 in FIG. 3A) for the sensors. Automated sensor placement is a hybrid or targeted approach, depending on its implementation, that uses input relating to the physical and logical zone layout of the installation site (e.g., lidar scans, images, and/or floorplans) to identify sensor placements that maximize system performance while minimizing the number of sensors. Sensors installed according to an installation map or sensor layout generated with this automated sensor process should be able to read and locate at least 99% of the RFID tags at the installation site.

FIGS. 5A-5D show a model of the coverage volume for an RFID reader 150 with a four-element square antenna array. The model has a square pyramid-like shape with a curved profile. It represents how much power the sensor delivers, when mounted to the ceiling, to different xyz locations as a function of transmit power, antenna gain, and path loss (attenuation). If desired, a level of margin can be applied to the coverage volume to account for tag antenna characteristics, multipath, and/or other nonidealities.

Figure 5A:
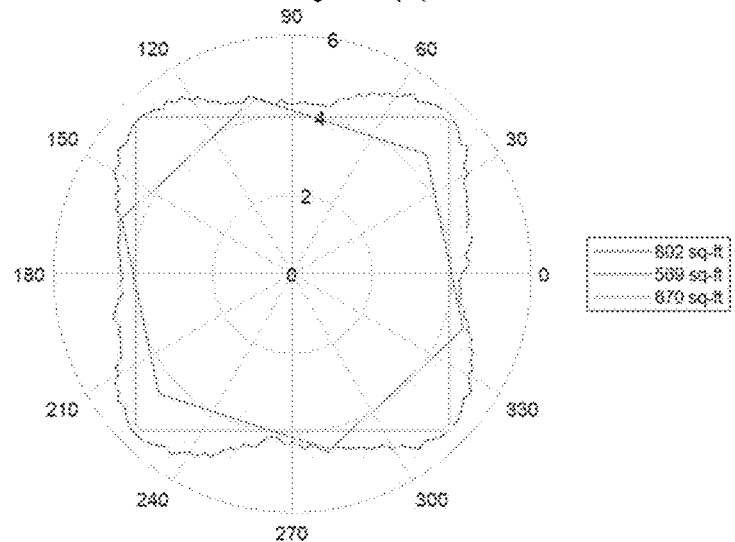
FIG. 5A is a cross-sectional view of the coverage volume of a four-element, square antenna array circumscribed about a square and an irregular hexagon.
Figure 5B:
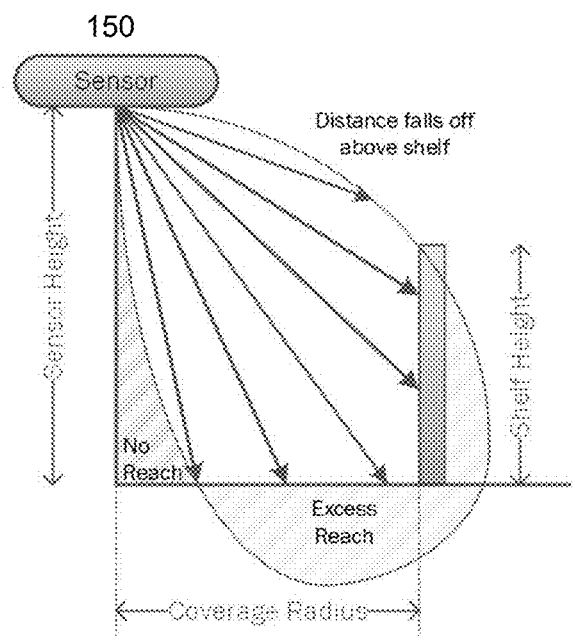
FIG. 5B is a profile view of the coverage volume of a four-element, square antenna array impinging on the floor and a shelf.
Figure 5C:
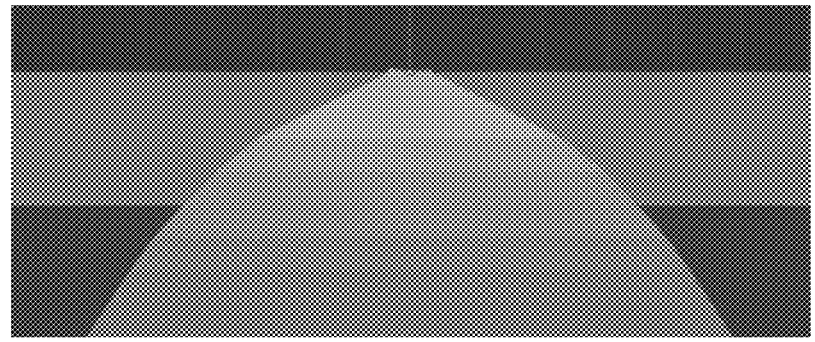
FIG. 5C is a profile view of the coverage volume of a four-element, square antenna array modeled as having a curved profile with a square cross-sectional area.
Figure 5D:
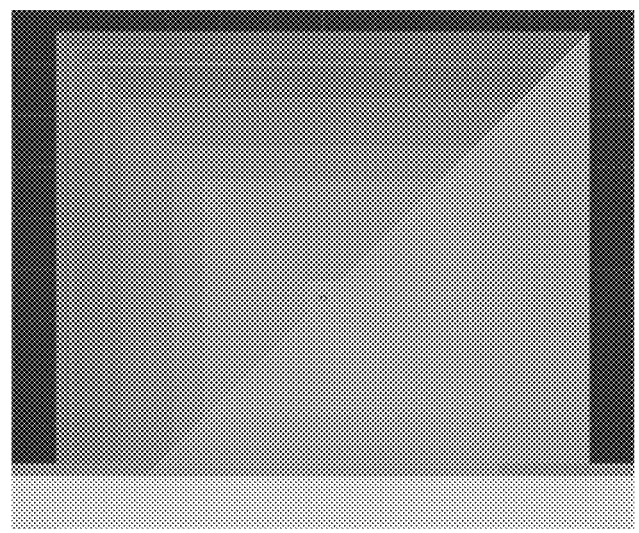
FIG. 5D is a plan view of the coverage volume of a four-element, square antenna array modeled as having a curved profile with a square cross-sectional area.
Figure 5E:
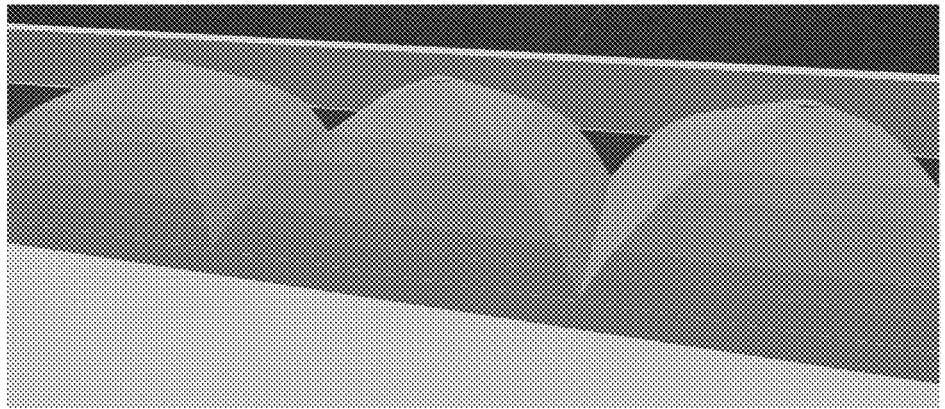
FIG. 5E is a perspective view of three overlapping coverage volumes for three neighboring sensors with four-element, square antenna arrays.
Figure 5F:
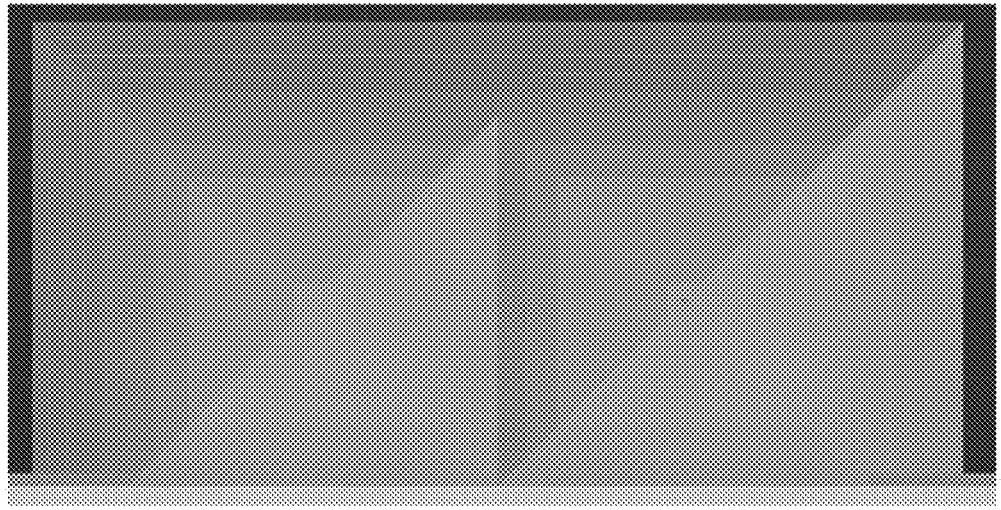
FIG. 5F is a plan view of two overlapping coverage volumes for three neighboring sensors with four-element, square antenna arrays.

FIG. 5A shows a cross section of the coverage volume circumscribed about a square and an irregular hexagon. The square cross section is a decent approximation of the coverage area at a given distance from the antenna array/height from the floor. Both squares and hexagons are convenient shapes for tiling a two-dimensional surface (e.g., the floor or a plane parallel to and above the floor). FIG. 5B shows a profile view of the antenna pattern projected against the floor and a shelf. The reach, or distance from the sensor 150 to the farthest detectable RFID tag position, falls off at shallower elevation angles and directly below the sensor 150. In FIG. 5B, the floor and shelf attenuate or block the signals, curtailing the sensor's reach. From this shape, the horizontal reach of a sensor can be calculated given the difference between the height of the targeted read area (estimated tag height) and the height of the sensor as shown in FIGS. 5C and 5D.

Modeling the coverage volume encompassed by the antenna pattern as having a curved profile with a square cross-sectional area as shown in FIGS. 5A-5D simplifies solutions for sensor layouts: the sensors can be laid out on a square grid or array with a pitch or spacing determined by the desired overlap between adjacent antenna patterns/coverage volumes. For sensors 150 in the middle of the salesfloor or other relatively open space, the sensor spacing may be selected so that the sensor reach is equal to half of the spacing between adjacent sensors 150. The square cross section estimation/approximation also means that the sensor reach can be calculated from a single input: the difference in the sensor height and the fixture height.

The automated sensor placement process also takes information about the installation site as input. This information can include information about fixtures, including their number, shape(s), size(s), placement(s), and whether or not they are rearranged regularly or frequently. This information can also include the expected height(s) of the tags above the floor. When determining coverage, the automated sensor placement process accounts for these heights and positions the sensors to ensure that tags within a given height of the floor receive enough power (with a margin applied for multipath and tag orientation) to be activated.

If the installation site is a retail store, for example, there may be tables and racks that are usually no higher than about 1 meter and can be rearranged regularly as well as shelves that are fixed to the walls and are no higher than about 2 meters. In this example, then, the sensors should be deployed so that the coverage volumes or antenna patterns intersect or overlap at a minimum height of 1 meter and intersect the walls at a minimum height of 2 meters. Other installation sites may have fixed fixtures and/or antenna patterns that overlap at other heights (e.g., 50 cm, 75 cm, 1.25 m, 1.5 m, etc.) and/or intersect the walls at other heights (e.g., 1.5 m, 1.75 m, 2.25 m, 2.5 m, etc.). In addition, the overlap and wall intersection heights for the antenna patterns may vary across the installation site, e.g., in different rooms or different areas, depending on the fixtures and the floorplan. In practice, automated sensor placement can treat the desired overlap and wall intersection heights as minimum heights and locate the sensors such that their coverage patterns overlap and/or intersect the wall(s) above the desired overlap and wall intersection heights.

Figure 6A:
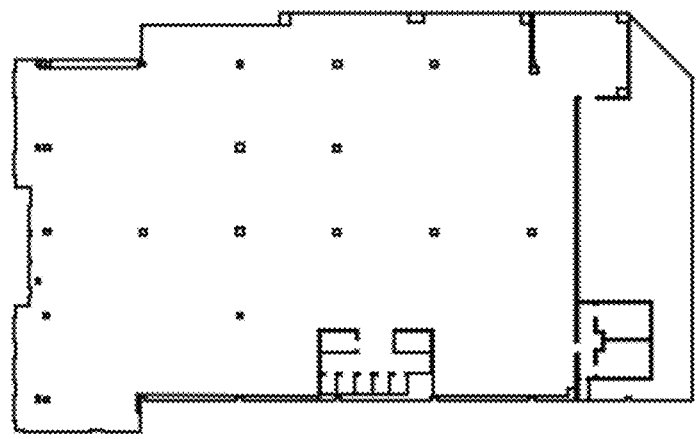
FIG. 6A shows a floor plan for an installation site.

FIG. 6A shows a floorplan derived from a lidar scan of an example installation site (e.g., acts 352, 354, and 356 of FIG. 3A). This floorplan shows walls, support columns/posts, and doorways. It can be divided into zones and overlaid with an absolute (installation site-specific) coordinate whose origin is fixed, e.g., to one corner of the store. This coordinate system is the coordinate system used to display the locations of the RFID tags located by the sensors.

Figure 6B:
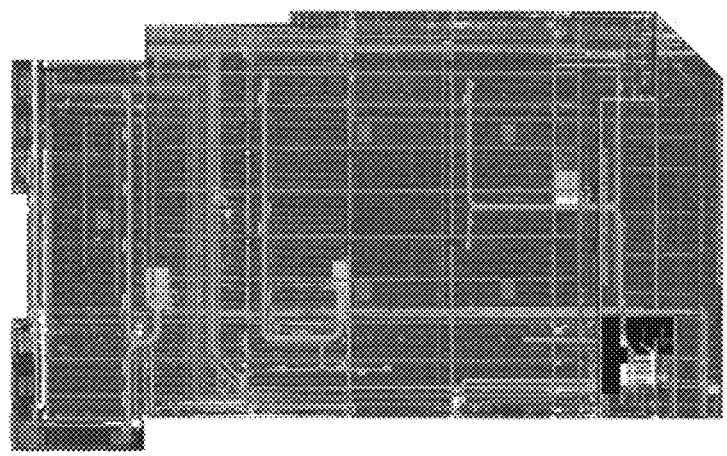
FIG. 6B is an image of the ceiling of the installation site of FIG. 6A shaded to represent ceiling height.

FIG. 6B shows a shaded image of the ceiling derived from a lidar scan of an example installation site (e.g., acts 352, 354, and 356 of FIG. 3A). The shading indicates variations in the ceiling height.

Figure 6C:
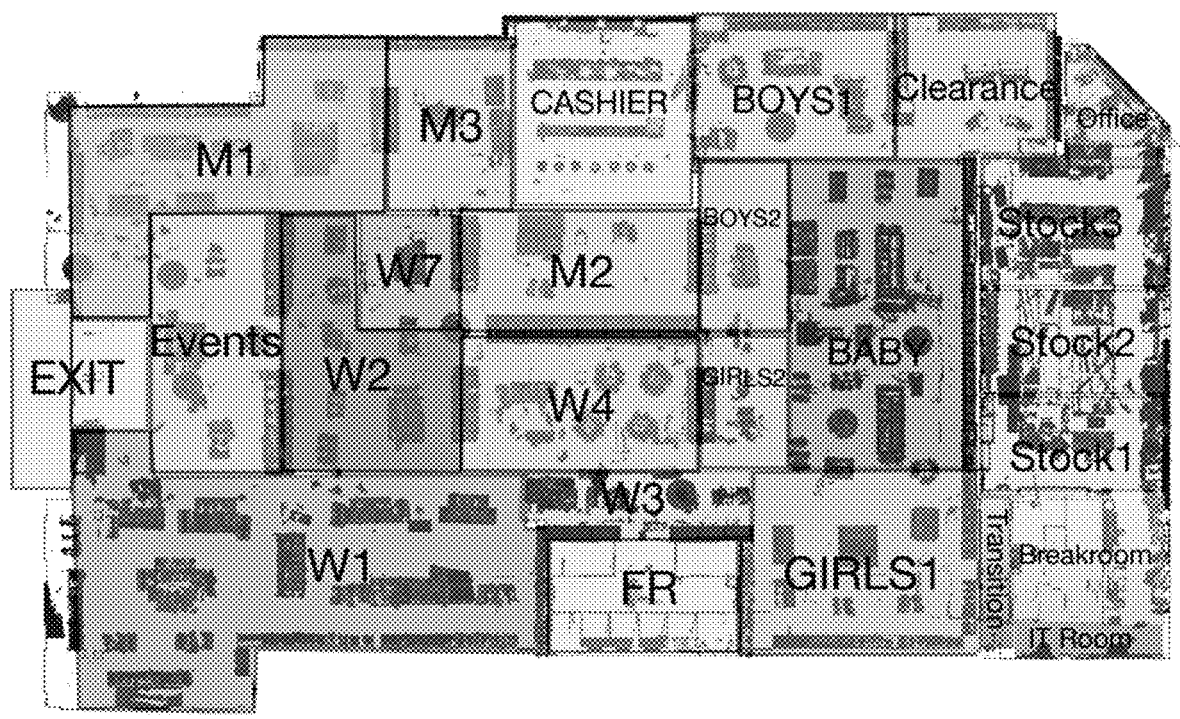
FIG. 6C shows the floor plan of FIG. 6A divided into zones, also called a zone coordinates artifact or zone layout.

FIG. 6C shows the floorplan shaded to indicate different zones. These zones can be identified and labeled manually (act 358 of FIG. 3A) using an appropriately programmed computer, tablet, or smartphone. Each zone can correspond to a different room or a different section of a larger space. For a retail store, the zone coordinates artifact can indicate whether a zone is Front of House (FOH) or Back of House (BOH) as well as the zone's shape, size, and location.

Specialized zones for specific sensor placement or stateful inventory include the exit, packing area, hold area, cash wrap, and receiving.

The zone coordinates artifact can be exported in JSON format for use in automated sensor placement. The JSON file can contain the coordinates of these zones as well as metadata relating to the zone name, type, and desired sensor placement. The zone coordinates artifact can be used for both automated sensor placement and for creating a three-dimensional (3D) model of the installation site. Some of the data included in the zone layout is not utilized for sensor placement such as the zone names and labels.

Automated sensor placement uses the zone coordinates in the zone layout or zone coordinates artifact to identify areas within the installation site to place sensors. Generally, sensors are placed only in zoned locations. Sensors may be omitted from some zones, such as office zones or information technology zones. Sensors in stateful inventory zones, such as exits, cashiers, transition areas, shipment receiving, may be placed in very specific locations, such as above each doorway or cash register.

As shown in the FIGS. 5A-5D, the pyramid-like antenna pattern/coverage model increases the coverage volume as the height of the sensor increases. Therefore, placing sensors at the highest possible location increases or maximizes the coverage volume for each sensor, potentially making it possible to use a smaller number of sensors to provide the desired coverage. With this in mind, automatic sensor placement includes an analysis of the color-coded ceiling image or other representation of the ceiling height to identify ceiling and obstruction heights. The ceiling image or other representation can be divided into a grid (e.g., a square grid with a grid spacing of 0.25 m) showing the maximum height for a sensor in each grid square, where the grid spacing is based on the ceiling height and the size and shape of the sensors' coverage volumes. A higher ceiling, for instance, may take a larger grid spacing because the sensors can be placed farther apart. Because the ceiling height can vary for a given installation site, the grid spacing can vary too, with shorter spacing for lower ceiling heights and longer spacing for higher ceiling heights. The maximum sensor height for each grid square should be below the lowest point of the ceiling directly above it and account for nearby ceiling obstructions.

Figure 7A:
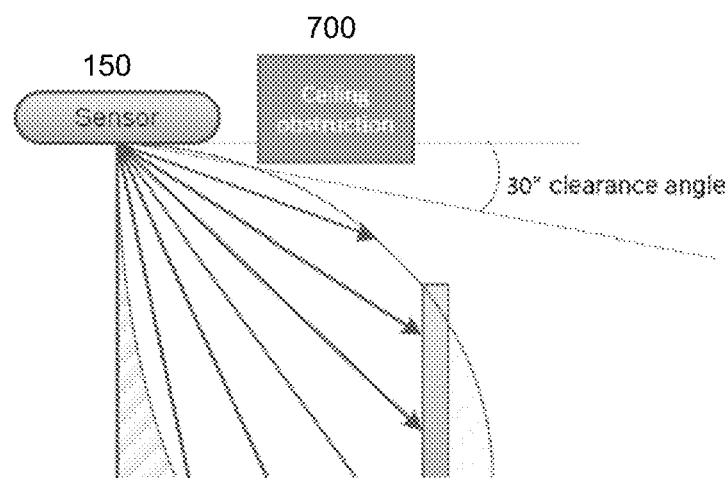
FIG. 7A illustrates an obstruction on the ceiling near an RFID reader.

FIG. 7A illustrates an obstruction 700 for a ceiling-mounted sensor 150 with the antenna pattern of FIGS. 5A-5D. Given the antenna pattern, there should be a clearance angle of at least 30 degrees between the bottom of the obstruction 700 and the horizontal plane (ceiling or floor) for satisfactory sensor placement.

Figure 7B:
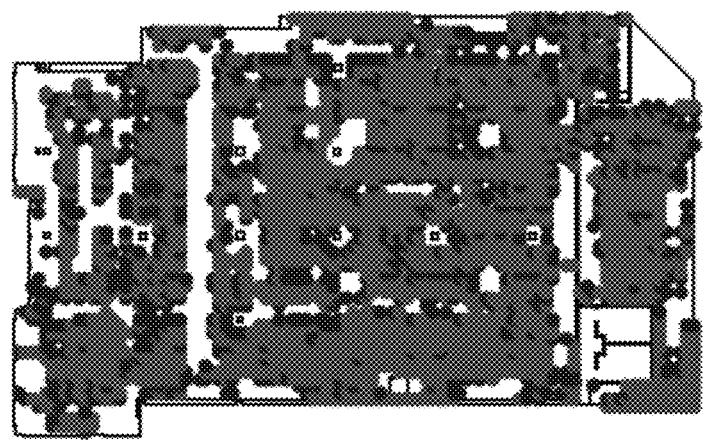
FIG. 7B illustrates a ceiling map shaded to represent potential RFID reader locations and their heights.

With the maximum sensor height at each grid square on the ceiling identified, sensors positions that are too low, obstructed, or otherwise unsuitable are filtered out. In particular, locations that are less than the desired minimum height (e.g., 3 m) or directly under small obstructions, such as light fixtures, sprinkler heads, or HVAC vent, are eliminated from consideration. These unsuitable locations can sometimes be identified by the large difference between the local height and the surrounding ceiling heights. FIG. 7B shows the floorplan of FIG. 6A shaded to indicate the elevations or heights of valid (suitable) locations for sensors (unshaded regions are unsuitable).

FIGS. 8A-8J illustrate how the desired locations for the sensors are selected with automatic sensor placement from the valid or suitable locations for sensors in FIG. 7B. Automatic sensor placement typically works on a room-by-room basis through the following steps. If the installed RFID system will operate according to a stateful inventory process, then sensors can be placed in designated stateful inventory zones. Stateful inventory is a process that aids in the retail operations and inventory accuracy of the RFID system. For more information on stateful inventory, see International Application No. PCT/US2023/061645, entitled "Stateful Inventory for Monitoring RFID Tags" and filed Jan. 31, 2023, which is incorporated herein by reference in its entirety for all purposes.

Typical stateful inventory zones include exits, cashiers, and receiving. Each of these areas or zones should have a specially placed sensor, e.g., an exit sensor in front of a doorway, or a receiving sensor in the center of the receiving area. Stateful inventory zones are identified in the zone coordinates artifact prior to automatic sensor placement. Determining sensor locations in stateful inventory zones first can avoid unnecessary sensor overlap and ensure that the stateful inventory zones get optimal sensor placements.

Figure 8A:
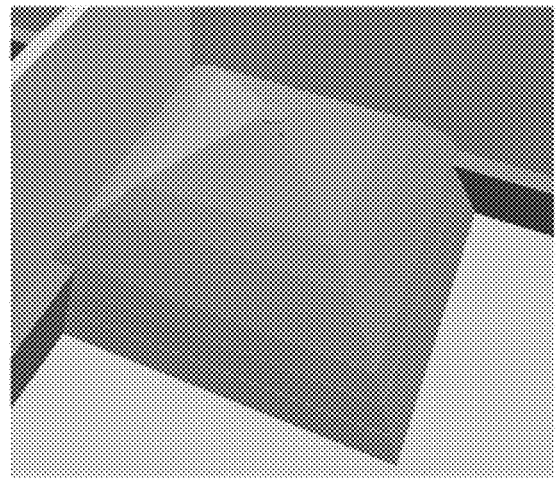
FIG. 8A is a perspective view of a coverage pattern for an RFID reader with a four-element, square antenna array intersecting walls forming a corner of the installation site at a first predetermined height (e.g., 2 meters).
Figure 8B:
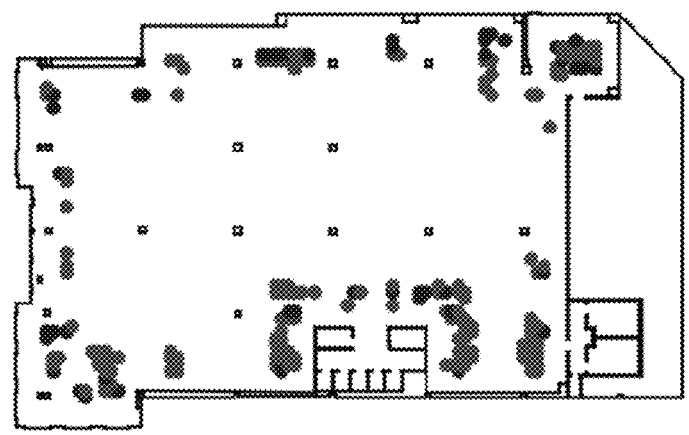
FIG. 8B illustrates initial locations for RFID readers near corners of the installation site.

Once sensor locations have been found in the stateful inventory zones, if any, the sensor locations near corners are chosen. There are many possible configurations of sensors across an open section of a room, each corner of a room can be optimally covered by a corresponding sensor with an antenna pattern with a (roughly) square cross section as shown in FIG. 8A. Using the sensor heights from the ceiling map (FIG. 7B), the sensor coverage model (FIGS. 5A-5D), and the assumption or target that the antenna pattern should intersect the walls at a predetermined height (e.g., 2 meters), it is possible to identify locations for which the antenna pattern for a sensor placed at the highest possible height intersects adjoining walls at the predetermined height. FIG. 8B shows possible locations of sensors for covering corners of the installation sites, with shading indicating ceiling height.

Figure 8C:
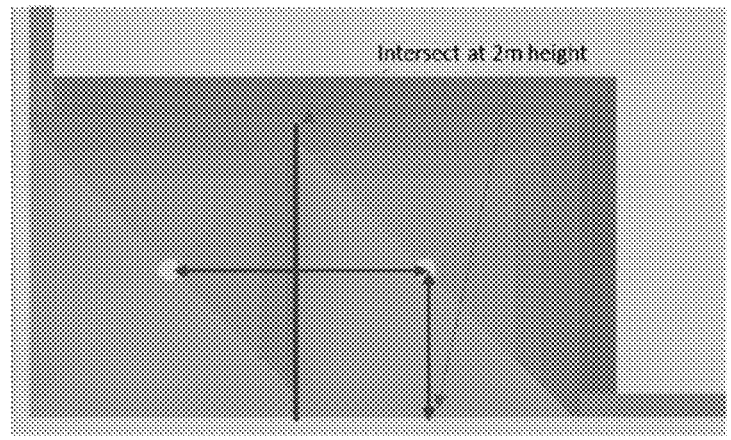
FIG. 8C is a plan view of overlapping coverage patterns for RFID readers with four-element, square antenna arrays along a perimeter of the installation site.
Figure 8D:
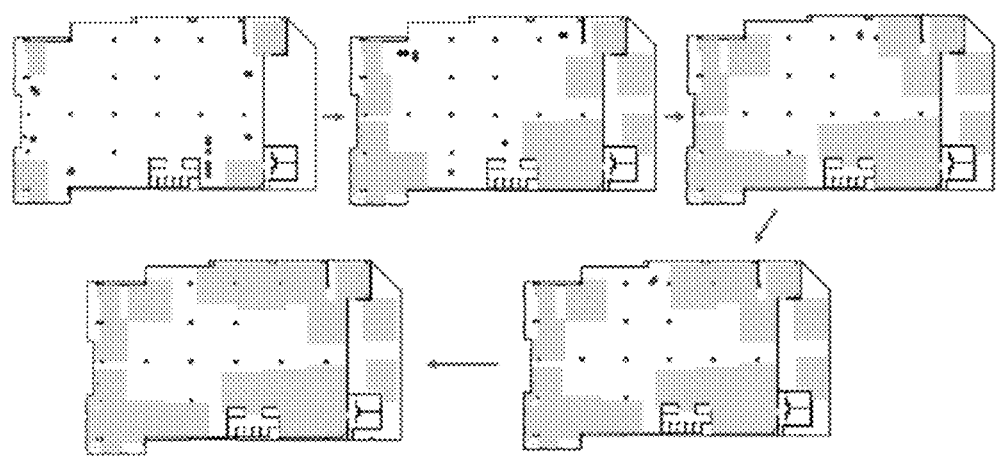
FIG. 8D illustrates placement of locations for RFID readers along the perimeters of the installation site.

FIGS. 8C and 8D show how the sensor locations around the perimeter of each room at the installation site are found next. Again, the sensors around the perimeter(s) should be placed such that their antenna patterns intersect at the wall at the (first) predetermined height and overlap with neighboring antenna patterns at a (second, possibly different) predetermined height (e.g., 1 meter). The first predetermined height can be the maximum height of shelves or other fixtures along the wall—the highest expected location of an RFID tag along the wall—and the second predetermined height can be the maximum height of tables, racks, or other fixtures on the floor—the expected height of RFID tags on the sales floor, for example. Put differently, each perimeter location is one in which the sensor's antenna pattern would intersect with one wall and one sensor. Unlike for corner placements, the perimeter placements step loops repeatedly until no new perimeter locations can be identified, yielding the coverage map shown in FIG. 8D in this example. At this point, the selected perimeter locations may not line the perimeter of the installation site perfectly due to ceiling obstructions, height limitations, or excessive overlap, but any gaps or excessive overlap between sensor patterns are addressed in subsequent steps of the automatic sensor placement process.

Figure 8E:
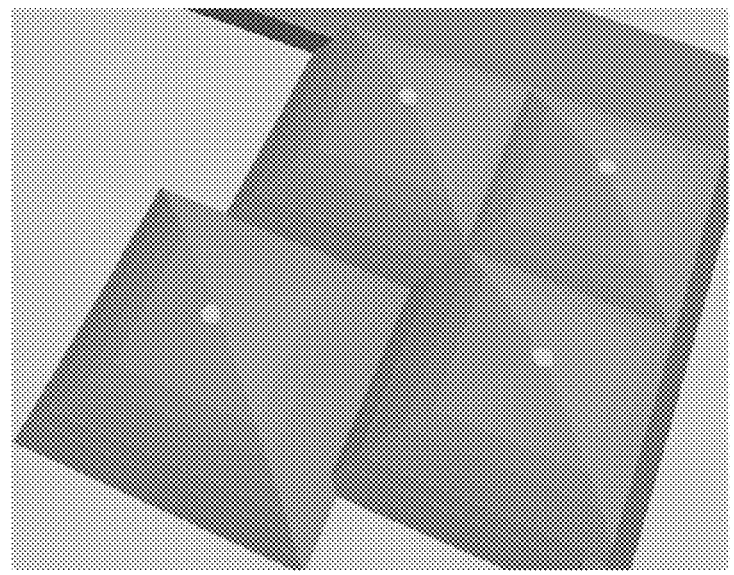
FIG. 8E is a perspective view of overlapping coverage patterns for RFID readers with four-element, square antenna arrays in an interior portion of the installation site.
Figure 8F:
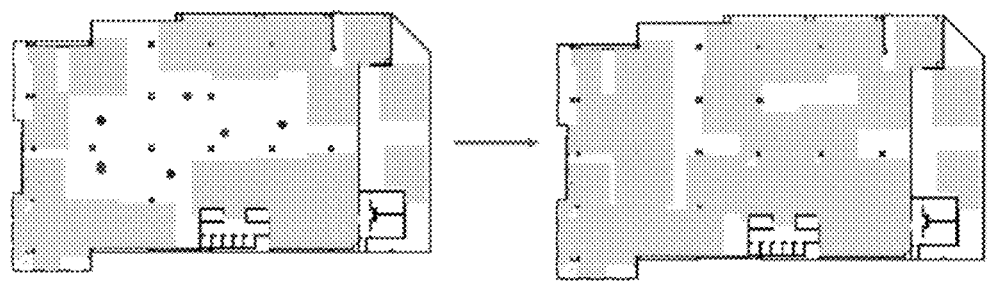
FIG. 8F illustrates placement of locations for RFID readers in interior portions of the installation site.
Figure 8G:
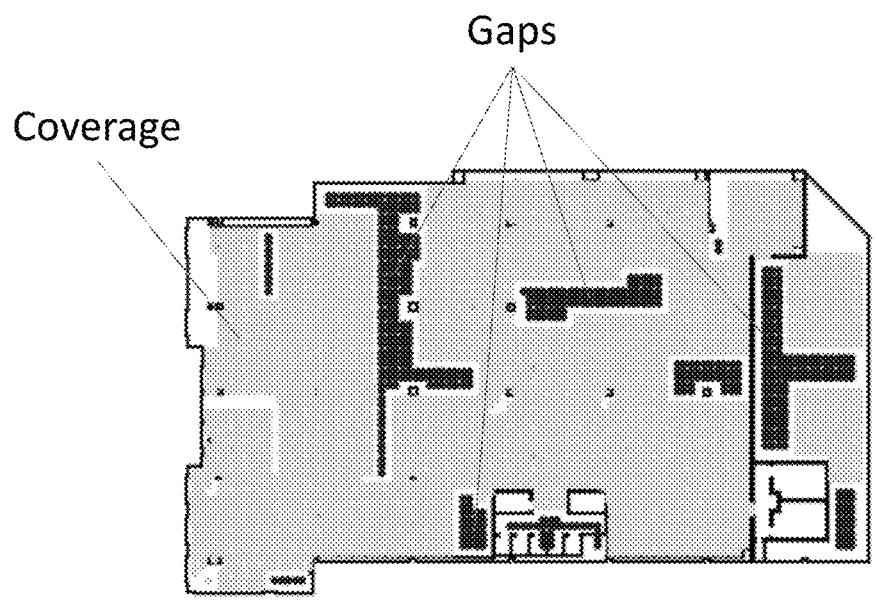
FIG. 8G illustrates gaps in coverage provided the by RFID readers.

Once sensor locations in the corners and along the walls have been identified, sensors can be placed iteratively in the interior of the (rooms of the) installation site as shown in FIGS. 8E and 8F. As discussed above, sensors over the floor should overlap coverage at around the second predetermined height (e.g., 1 meter), allowing these sensors to be spaced slightly further apart than the perimeter sensors. Iterations continue until no more (ideal) sensor locations can be found using the antenna pattern overlap criteria, even if there are still gaps in the sensor coverage.

Figure 8H:
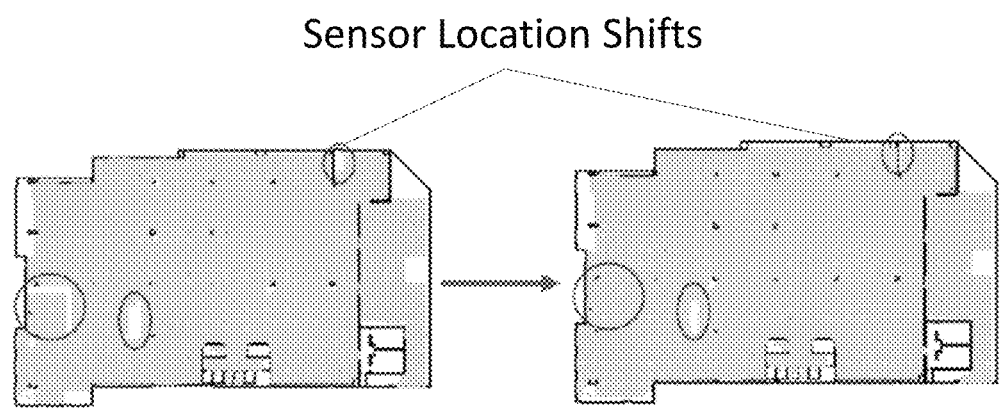
FIG. 8H illustrates how shifting locations of RFID readers shrinks or eliminates gaps in coverage.

Once the interior or floor sensor locations have been determined, any gaps in the sensor coverage can be filled by iteratively adding sensor locations to fill coverage gaps and shifting existing sensor locations to fill coverage gaps. Iterating between these steps reduces or eliminates coverage gaps and distributes sensor coverage and overlap more evenly. On the first iteration, shown in FIG. 8G, large coverage gaps are identified as areas for new sensor locations. A sensor location is placed near the center of each gap, with gaps subdivided into multiple sections if they are too large to be covered by a single sensor. After this first iteration of adding sensor locations, there may still be some coverage gaps, with FIG. 8H showing circles around gaps in coverage. FIG. 8H (right) also shows that shifting one or more sensor locations can reduce or eliminate these gaps. Shifting accounts for nearby walls, uncovered gaps, and areas of overlap, with small iterative shifts to any sensor location increasing the total area covered in the store. This part of the automated sensor placement process continues until no additional coverage can be gained by shifting sensors. As the final coverage gaps can be very small, adding new sensor locations to these areas can lead to concentrated areas of sensor overlap, which can give an imbalance of sensor coverage at the installation site. The final coverage shift distributes sensor overlap more evenly throughout the installation site, providing a consistent coverage and more tolerance for performance or installation errors.

Figure 8I:
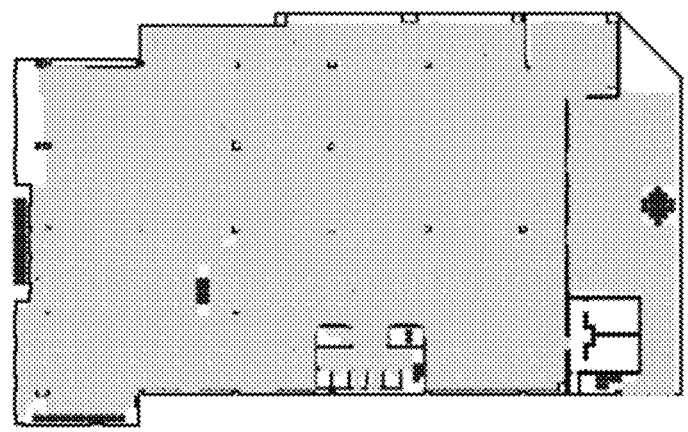
FIG. 8I illustrates a coverage map with potentially redundant RFID reader locations.
Figure 8J:
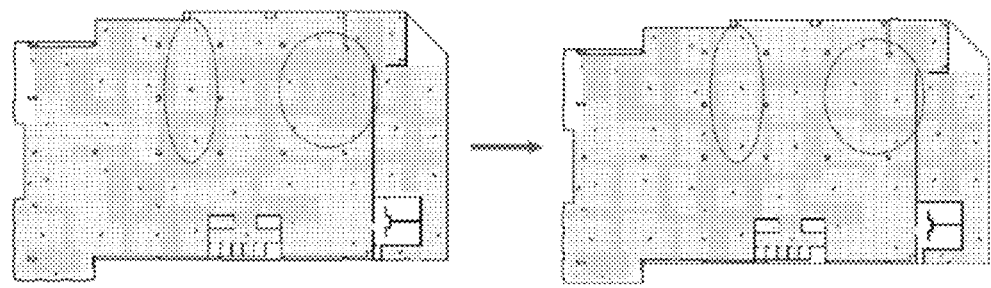
FIG. 8J illustrates identification and elimination of redundant RFID reader locations.

FIGS. 8I and 8J illustrate the last step of automated sensor placement: identifying and removing (purely) redundant sensors/sensor locations. A sensor location is redundant if a sensor installed at that sensor location would have an antenna pattern that overlaps completely with antenna patterns of other sensors. This situation can arise through the gap filling and sensor shifting process, as a sensor that was added to fill a gap may cause other sensors to shift, yielding excessive overlap among their antenna patterns/coverage volumes. If this situation occurs, the sensor with the smallest coverage volume or lowest sensor (in height) can be removed from the sensor layout, and the layout can be adjusted (e.g., some or all of the sensor locations can be shifted) as appropriate. The final sensor coordinates can be exported, e.g., in JSON format, with specialized SI sensors indicated to the backend for extra configuration if desired (act 364).

If time, memory, and processing power permit, automated sensor placement for a given installation site can be carried out, either simultaneously or sequentially, with different input parameters, e.g., different antenna pattern overlap heights or spacings between sensor locations. Performing automated sensor placement with different inputs can yield sensor layouts with equal or similar coverage of an installation site with different numbers of sensors. By generating multiple layouts for an installation site using a range of inputs (e.g., different spacings between adjacent sensors), then determining the coverage and sensor count for each layer, and comparing these layouts to each other, it is possible to select a layout with the desired coverage and lowest sensor count.

Alternative Methods of Determining Installation Locations for RFID Readers

Figure 9:
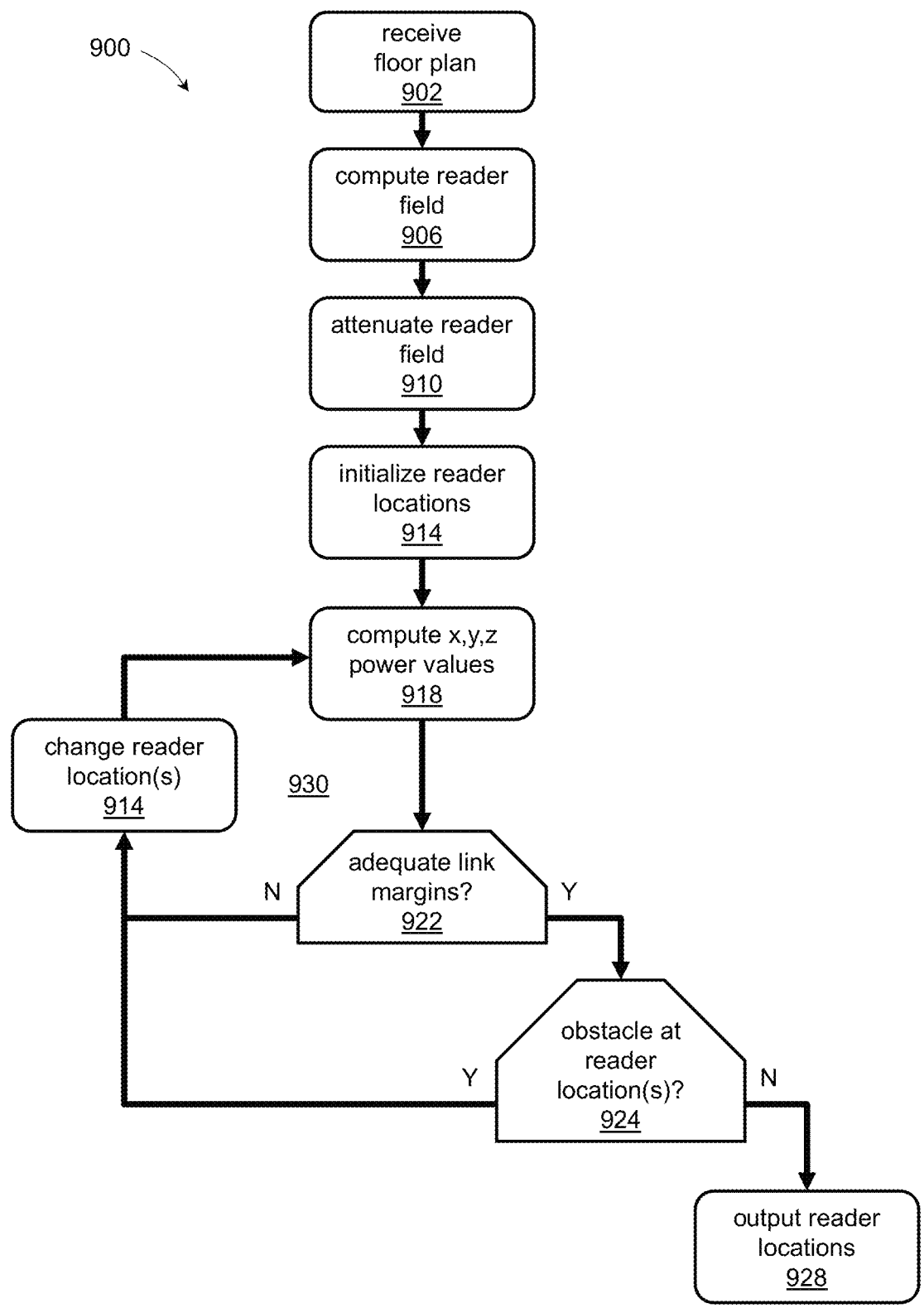
FIG. 9 depicts a process for determining locations for RFID readers in an RFID environment.

FIG. 9 illustrates a process 900 of determining RFID reader locations for an installation site, such as a retail store, warehouse, museum, art gallery, etc. The process 900 can be applied for generic, targeted, and/or hybrid approaches and can be implemented at least in part with a processor adapted with code to model antenna patterns of RID readers 150 or emission of RF fields from RFID readers 150. The process 900 may begin with receiving (act 902) a floor plan or other representation, such as a lidar scan, of the RFID environment 100 where RFID readers 150 will be installed. The floor plan can include dimensions of the floor space where RFID tags 101 will be located and ceiling height(s) for the floor space. In some implementations, the RFID readers 150 are mounted at essentially the ceiling level, though readers can be suspended from the ceiling and mounted at a lower level or may be mounted above ceiling panels.

The process can continue with computing (act 906) an antenna pattern for each RFID reader 150 or other representation of the volume over which each RFID reader 150 can transmit and detect RF fields. These pattern(s) may depend on parameters of the RFID readers, their antenna, and how the readers are operated (e.g., at one or more frequencies). In some cases, the emission pattern for a reader 150 can be determined empirically or from specifications provided with the RFID reader 150. In some cases, the antenna pattern can be determined primarily based on the reader's antenna configuration and how it is operated (e.g., whether the antenna comprises an array of antennas and whether they are used to produce a static emission pattern or a beam that is swept). In some implementations, the RFID reader 150 can have a phased-array antenna that allows for beam forming and steering.

The computed RF field for a single RFID reader 150 can be determined from the different emissions into free space around the reader. In a first approximation, the RF field is computed without consideration for signal-scattering objects or signal-attenuating objects that may be located within the RFID environment 100 at the installation site. The computed RF field can be for voxels at different $x_r$, $y_r$, $z_r$ locations around the RFID reader where the locations are determined with respect to the location of the RFID reader (e.g., $x_r=0$, $y_r=0$, $z_r=0$). As one example, the $x_r$, $y_r$, $z_r$ locations can be spaced one foot apart (defining a voxel of one cubic foot) and extend below and around the RFID reader 150 from the peak field value to locations where the field or power level is one-half or one-quarter the peak field or power level, though other cut-off criteria may be used. The field value for each voxel can be the peak computed RF field that is computed for the voxel due to any of the emitted beams. For example, if three emitted beams produce RF field in a voxel, the value of RF field that is highest among the three beams is selected as the peak RF field for the voxel. If more than one beam were emitted at the same time into the voxel, then the RF field for the voxel would be the sum of RF fields from beams producing RF field in the voxel.

In some implementations, the computed RF field for one RFID reader 150 can be attenuated (act 910) to account for signal-scattering objects and/or signal-attenuating objects that could be present in the RFID environment 100. The attenuation factor can be a value in a range from 0.05 to 0.95 and may depend upon details of the RFID environment 100 and tagged objects. For example, the attenuation factor may depend on the number of fixtures and/or furnishings in the environment, the material(s) from which those fixtures and/or furnishings are made, the proximity of tagged items to walls, the maximum density of tagged items, etc. When implemented, the attenuation factor can be used to account for anticipated forward and reverse link losses in the RFID environment 100 between the RFID readers 150 and RFID tags 101. In some cases, attenuation (act 910) of the computed RF field may not be done and signal loss can be accounted for when evaluating (act 922) the link margin, as described further below.

The process 300 can continue with selecting initial reader locations (act 914). When used in a generic approach to determining sensor locations, the initial locations may be on a rectangular (e.g., square) grid pattern with a spacing selected automatically or by a user. The initial spacing between RFID readers 150 can be 10 feet, 15 feet, 20 feet or any other suitable trial value. Other grid patterns (e.g., hexagonal) and spacings (e.g., from half the desired sensor reach to the desired sensor reach, where the sensor reach is the sensor range as projected onto a plane parallel to the ceiling or floor and at a particular distance from the ceiling or floor) can also be used.

Using the trial locations and the computed RF field values for each RFID reader 150, the power at voxels in different x, y, z locations of interest throughout the RFID environment can be computed. The x, y, z locations can be spaced one foot apart, for example, though other spacings can be used. The x, y, z locations can be at centers of voxels having exterior dimensions equivalent to the spacing between the x, y, z locations. Since only one RFID reader 150 and one focused beam may be active at a time, the power at each x, y, z location of interest is proportional to the square of the largest computed RF field produced at that location from any one of the RFID readers 150 that emits an RF field into that location.

A location of interest in the RFID environment 100 is a location that an RFID tag may inhabit during (business) operations in the RFID environment. Such locations of interest can be from six inches above the floor to seven feet above the floor in some retail settings, including within aisles where tags may be transported. In some cases, locations of interest may be intentionally restricted further. For example, in a setting where tags and attached objects are too densely packed on shelves or the tags or objects are on metal shelves where they cannot all be read, it may be sufficient to have locations of interest restricted to only the aisles where individual tags can be detected when being placed on the shelves or removed from the shelves.

Once the power values are determined for all x, y, z locations ($P_{x,y,z}$) of interest in the RFID environment 100, the power levels having the lowest values can be used to determine (act 922) whether all RFID tags in the RFID environment can be interrogated and communicated with. In order to communicate with an RFID tag, that RFID tag must receive enough power $P_{min}$ at its x, y, z location to excite the tag to operate and backscatter a signal having enough power that can be detected by an RFID reader 150 in the environment 100. When expressed this way, $P_{min}$ incorporates a number of factors that influence the forward link from the RFID reader 150 to the RFID tag 101 and the reverse link from the RFID tag to the RFID reader. For example, $P_{min}$ accounts for forward and reverse path losses, tag sensitivity, and reader sensitivity. $P_{min}$ represents a threshold amount of power at a voxel to establish communication with an RFID tag at the voxel.

To better assure communication with an RFID tag, a link margin can be used. The link margin can be used to determine a target amount of power $P_c$ (in excess of $P_{min}$) that should be provided to each x, y, z location or voxel of interest within the RFID environment 100 to reliably establish communications between the RFID reader and RFID tag at that location. Without being bound to a particular theory, the link margin can be described with the following expression:

$$P_c = (1 + m)P_{min}$$

where m represents the link margin value. The link margin value m is dimensionless when expressed this way and can have a value greater than 0.05. Another way to express link margin is in terms of power as follows:

$$P_c = P_{min} + P_{lm},$$

where $P_{lm}$ represents the link margin power value (e.g., 10 dBm or some other value).

When forward and reverse path losses, tag sensitivity, and reader sensitivity are accounted for with $P_{min}$ and a link margin m is used, attenuation (act 910) of the reader's field may be omitted. In some cases, attenuation (act 910) of the reader's field can be implemented and the link margin can be set to zero (m=0). Of course, in some cases both attenuation and link margin can be used.

With a selected link margin value m and target power $P_c$, the computed powers $P_{x,y,z}$ for each location can be compared against the target power $P_c$ for that location to determine (act 922) whether there is an adequate link margin for each x, y, z location in the RFID environment 100. If there is not an adequate link margin, then the RFID reader locations can be changed (act 914) (e.g., by decreasing the spacing between readers) and the acts of computing power values (act 918) and determining whether there is an adequate link margin (act 922) at each location can be repeated.

When adequate link margins are established for all cells of interest in the RFID environment, the process 900 may continue with determining (act 924) whether there is a physical obstacle (sprinkler, light, smoke detector, etc.) at one or more intended reader locations. In some cases, the locations of physical obstacles can be determined from the floor plan or other representation of the RFID environment 100. In some implementations, the location of physical obstacles may not be known until on-site installation commences. If it is determined that a physical obstacle is at an intended location for an RFID reader 150, then the location of the reader can be changed (act 914) to a nearest available location, for example. Power values can then be re-computed (act 918) and link margins re-evaluated (act 922). In some cases, the changes due to physical obstacles can prompt relocating all the RFID readers 150 in the environment 100 to obtain adequate link margins. For example, adequate link margins can be established for all voxels of interest by iterating loop 930 of process 900. Once adequate link margins are established for all voxels of interest in the RFID environment 100 and there are no obstacles at intended locations for the RFID readers 150, the reader locations can be output (act 928) for subsequent use by an installer who will place the RFID readers in the environment.

There can be refinements to the process 900 to improve the placement of the RFID readers 150. One refinement can be to locate at least one of the RFID readers 150 directly over a heavily trafficked area, such as beside a door or passageway between a retail area and stockroom, over a check-out area, and/or over exits from the RFID environment. RFID readers in such locations can detect movement of tags (e.g., to and from the retail space).

Another refinement can be to set the spacing between walls and RFID readers to be less than the spacing between RFID readers. The inventors have found that RFID tags near walls can be more difficult to read due to reflections from the walls. Locating RFID readers closer to walls can improve readability of RFID tags near walls. As an example, the RFID reader 150 may be spaced 16 feet from each other over the RFID environment 100. However, the peripheral RFID readers may be spaced 6 feet from walls bounding the RFID environment. In some cases, the shortest distance from an RFID reader 150 to a wall 110, 112 can be a fraction of the spacing distance between RFID readers. The fraction can have a value in a range from approximately or exactly 0.4 to approximately or exactly 0.9, for example.

In some implementations, RFID readers 150 can be located close to areas where RFID tags are likely to be densely packed (e.g., on multiple shelves in a stack of shelves). For example, it may be beneficial to locate some readers above and within a horizontal distance of 2 feet (or some other horizontal distance between approximately or exactly 5 feet and approximately or exactly 0 feet) of a stack of shelves that will hold a dense population of RFID tags. Locating an RFID reader closer to such dense populations of tags can boost the RF signal strength to and from RFID tags in the dense population compared to RF signals to and from RFID tags located in sparser populations farther from the RFID reader.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the components so conjoined, i.e., components that are conjunctively present in some cases and disjunctively present in other cases. Multiple components listed with "and/or" should be construed in the same fashion, i.e., "one or more" of the components so conjoined. Other components may optionally be present other than the components specifically identified by the "and/or" clause, whether related or unrelated to those components specifically identified. Thus, as a non-limiting example, a reference to "A and/or B", when used in conjunction with open-ended language such as "comprising" can refer, in one embodiment, to A only (optionally including components other than B); in another embodiment, to B only (optionally including components other than A); in yet another embodiment, to both A and B (optionally including other components); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of components, and, optionally, additional unlisted items. Only terms clearly indicated to the contrary, such as "only one of" or "exactly one of," or, when used in the claims, "consisting of," will refer to the inclusion of exactly one component of a number or list of components. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more components, should be understood to mean at least one component selected from any one or more of the components in the list of components, but not necessarily including at least one of each and every component specifically listed within the list of components and not excluding any combinations of components in the list of components. This definition also allows that components may optionally be present other than the components specifically identified within the list of components to which the phrase "at least one" refers, whether related or unrelated to those components specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including components other than B); in another embodiment, to at least one, optionally including more than one, B, with no A present (and optionally including components other than A); in yet another embodiment, to at least one, optionally including more than one, A, and at least one, optionally including more than one, B (and optionally including other components); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of deploying radio-frequency identification (RFID) readers in an installation site, the method comprising:
   measuring ceiling heights and locations of walls and/or fixtures in the installation site;
   determining, based on the ceiling heights and the locations of walls and/or fixtures, intended locations for the RFID readers in the installation site;
   provisioning a central controller for the RFID readers with a configuration file representing the intended locations for the RFID readers;
   installing the RFID readers in the installation site;
   measuring actual locations of the RFID readers;
   provisioning the central controller with an updated configuration file representing the actual locations of the RFID readers; and
   commissioning the central controller and the RFID readers to locate RFID tags in the installation site based on signals from the RFID tags received by the RFID readers and the actual locations of the RFID readers.

2. The method of claim 1, wherein:
   measuring the ceiling heights and the locations of walls and/or fixtures comprises performing a first lidar scan of the installation site; and
   measuring the actual locations of the RFID readers comprises performing a second lidar scan of the installation site.

3. The method of claim 1, wherein determining the intended locations for the RFID readers comprises generating a floor plan of the installation site and a ceiling image representing the ceiling heights.

4. The method of claim 1, wherein determining the intended locations for the RFID readers comprises identifying potential obstructions based on the ceiling heights and/or coverage volumes of the RFID readers.

5. The method of claim 1, wherein determining the intended locations for the RFID readers comprises selecting the intended locations such that coverage volumes of adjacent RFID readers intersect at a predetermined height based on an expected maximum height of the RFID tags in the installation site.

6. The method of claim 1, wherein determining the intended locations for the RFID readers comprises selecting the intended locations such that coverage volumes of RFID readers adjacent to the walls intersect the walls at or above a predetermined height based on an expected maximum height of the RFID tags on fixtures along the walls.

7. The method of claim 1, wherein determining the intended locations for the RFID readers comprises selecting the intended locations such that coverage volumes of adjacent RFID readers intersect at or above a predetermined height.

8. The method of claim 7, wherein the predetermined height is based on a height of a fixture that will hold the RFID tags.

9. The method of claim 1, wherein determining the intended locations for the RFID readers comprises:
   generating different sets of possible sensor locations based on different desired spacings between adjacent sensor locations;
   determining a coverage and sensor count for each of the different sets of possible sensor locations; and
   selecting one of the different sets of possible sensor locations as the intended locations based on the coverages and sensor counts for the different sets of possible sensor locations.

10. The method of claim 1, wherein installing the RFID readers in the installation site comprises adjusting a pitch and/or a roll of at least one of the RFID readers to an angle of 0.0°±0.25°.

11. The method of claim 1, wherein installing the RFID readers in the installation site comprises:
    connecting each of the RFID readers to a corresponding Ethernet switch; and
    connecting the corresponding Ethernet switch to the central controller.

12. The method of claim 1, further comprising, after installing the RFID readers:
    measuring angular orientations of the RFID readers,
    wherein the updated configuration file further represents the angular orientations of the RFID readers.

13. The method of claim 1, further comprising, before commissioning the central controller and the RFID readers:
    testing coverage of the installation site by the RFID readers.

14. RFID tag readers deployed according to the method of claim 1.

15. A method of deploying radio-frequency identification (RFID) readers in an installation site, the method comprising:
    selecting corner locations such that coverage volumes of RFID readers at the corner locations intersect walls forming corners at or above a first predetermined height based on an expected maximum height of RFID tags on fixtures along the walls;
    selecting perimeter locations such that coverage volumes of RFID readers at the perimeter locations intersect walls at the first predetermined height and intersect neighboring coverage volumes at or above a second predetermined height based on an expected maximum height of the RFID tags in the installation site;
    selecting interior locations such that coverage volumes of RFID readers at the interior locations intersect adjacent coverage volumes at or above the second predetermined height;
    installing the RFID readers at the corner locations, perimeter locations, and interior locations; and
    commissioning the RFID readers to locate RFID tags in the installation site based on signals from the RFID tags received by the RFID readers and actual locations of the RFID readers.

16. The method of claim 15, wherein the first predetermined height is about 2 meters and the second predetermined height is about 1 meter.

17. The method of claim 15, further comprising, before selecting the corner locations, the perimeter locations, and the interior locations:
    identifying obstructions and/or regions with ceiling heights below a predetermined threshold in the installation site.

18. The method of claim 15, further comprising, before installing the RFID readers:

identifying gaps in coverage provided by the RFID readers at the corner locations, the perimeter locations, and the interior locations; and iteratively adding and shifting locations of the RFID readers to reduce and/or eliminate the gaps.

19. The method of claim 15, further comprising, after installing the RFID readers and before commissioning the RFID readers:

measuring the actual locations of the RFID readers; and provisioning a central controller with a configuration file representing the actual locations of the RFID readers, wherein locating the RFID tags is based on the configuration file.

20. RFID readers deployed according to the method of claim 15.

21. A method of locating radio-frequency identification (RFID) readers in an RFID environment containing a population of RFID tags, the method comprising:

receiving floor plan information that describes an extent of physical space of the RFID environment;

determining first locations within the physical space for a plurality of RFID readers, the first locations being distributed across the physical space in a first pattern;

computing a first plurality of peak radio-frequency (RF) power levels at a plurality of locations of interest within the physical space, wherein the first plurality of peak RF power levels are based on RF fields emitted by the plurality of RFID readers and the first locations of the plurality of RFID readers and wherein each location of interest is a sub-region of the physical space that an RFID tag is expected to inhabit within the RFID environment;

determining, for at least a first location of interest of the plurality of locations of interest, that a first peak RF power level of the first plurality of peak RF power levels for the first location of interest does not satisfy a link margin criterion, wherein the link margin criterion identifies a target power level that establishes communications between at least one RFID reader of the plurality of RFID readers and an RFID tag located at the first location of interest;

in response to the first peak RF power level not satisfying the link margin criterion, determining second locations within the physical space for the plurality of RFID readers, the second locations being distributed across the physical space in a second pattern that has spacings between the RFID readers of the plurality of RFID readers that is less than spacings between the RFID readers for the first pattern;

computing a second plurality of peak RF power levels at the plurality of locations of interest within the physical space, wherein the second plurality of peak RF power levels are based on the RF fields emitted by the plurality of RFID readers and the second locations of the plurality of RFID readers;

determining, for at least the first location of interest or a second location of interest of the plurality of locations of interest, that a second peak RF power level of the second plurality of peak RF power levels for the first location of interest or the second location of interest satisfy the link margin criterion for the first location of interest or the second location of interest, wherein the first location of interest or the second location of interest is a location having a lowest peak RF power level of the second plurality of peak RF power levels; and in response to the second peak RF power level satisfying the link margin criterion, outputting the second locations as intended locations for installing the plurality of RFID readers.

\* \* \* \* \*